United States Patent

[11] 3,569,823

[72] Inventor Marcel J. E. Golay
 Rumson, N.J.
[21] Appl. No. 768,809
[22] Filed Oct. 18, 1968
[45] Patented Mar. 9, 1971
[73] Assignee The Perkin-Elmer Corporation
 Norwalk, Conn.

[54] NUCLEAR MAGNETIC RESONANCE APPARATUS
 4 Claims, 64 Drawing Figs.
[52] U.S. Cl. .................................................... 324/0.5,
 336/200, 317/123
[51] Int. Cl. ..................................................... G01n 27/78
[50] Field of Search.......................................... 324/0.5,
 (L.7), (Inquired); 336/200, 208, (Inquired);
 317/123

[56] References Cited
UNITED STATES PATENTS
1,829,740 11/1931 Drake............................ 336/208
3,406,333 10/1968 Nelson ........................... 324/0.5

Primary Examiner—Michael J. Lynch
Attorney—Edward R Hyde, Jr.

ABSTRACT: An improved field homogenizing coil arrangement of a type having a generally tubular coil form extending about a test sample in an NMR apparatus is described. The coil arrangement includes a plurality of separate coils which are orthogonally related and which are formed of conductive segments positioned on opposite surfaces of the coil form and are conductively coupled through the form. The coils include arcuate-shaped segments positioned on one surface of the form and aligned normally with respect to a main polarizing field component, and rectilinear shaped segments positioned on an opposite surface of the form and extending in a direction substantially parallel to the main polarizing field component. The conductive segments are fabricated on the form by printed circuit techniques and the form is adapted to be rolled into a scroll-shaped configuration. With this arrangement, a relatively large number of field corrective coils are positioned on the form while overlapping rectilinear segments cancel undesired fields established by current return paths.

INVENTOR.
Marcel J.E. Golay
BY
Frank J. Thompson
ATTORNEY.

1,0

1,0

2,0

2,0

3,0

3,0

4,0

4,0

5,0

5,0

2,1

2,1

2,1

(2,1)'

(2,1)'

(2,1)'

2,1

3,1

3,1

3,1

(3,1)'

(3,1)'

(3,1)'

3,2

3,2

3,2

(3,2)'

(3,2)'

(3,2)'

4,1

4,1

4,1

(4,1)'

(4,1)'

(4,1)'

4,2

4,2

4,2

(4,2)'

(4,2)'

(4,2)'

4,3

4,3

4,3

(4,3)'

(4,3)'

(4,3)'

2,0

4,0

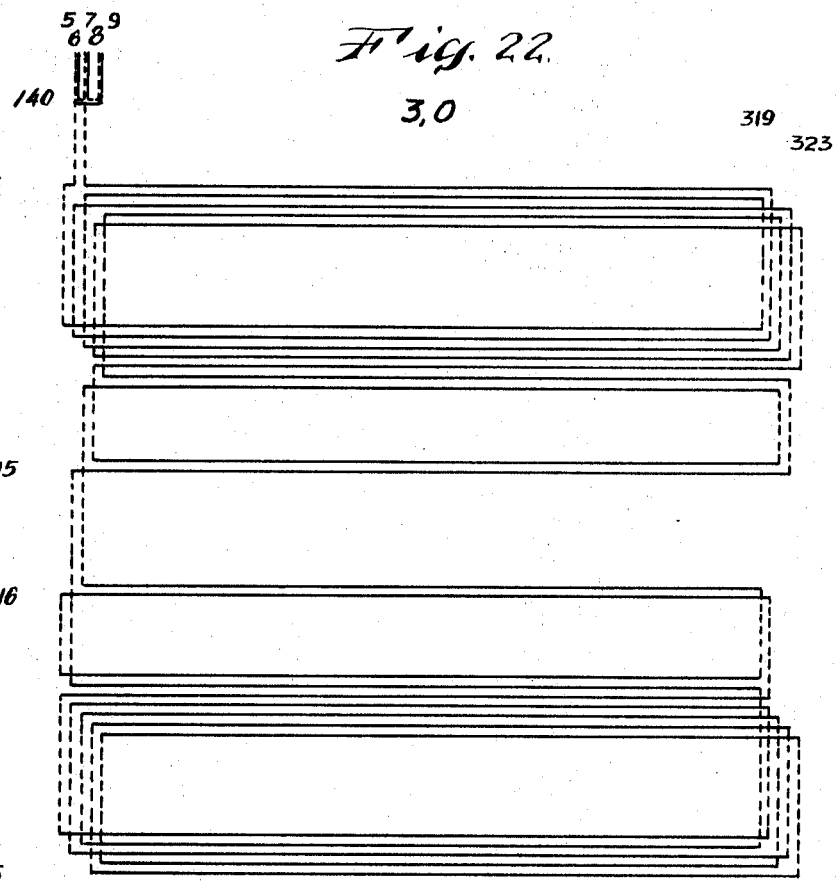
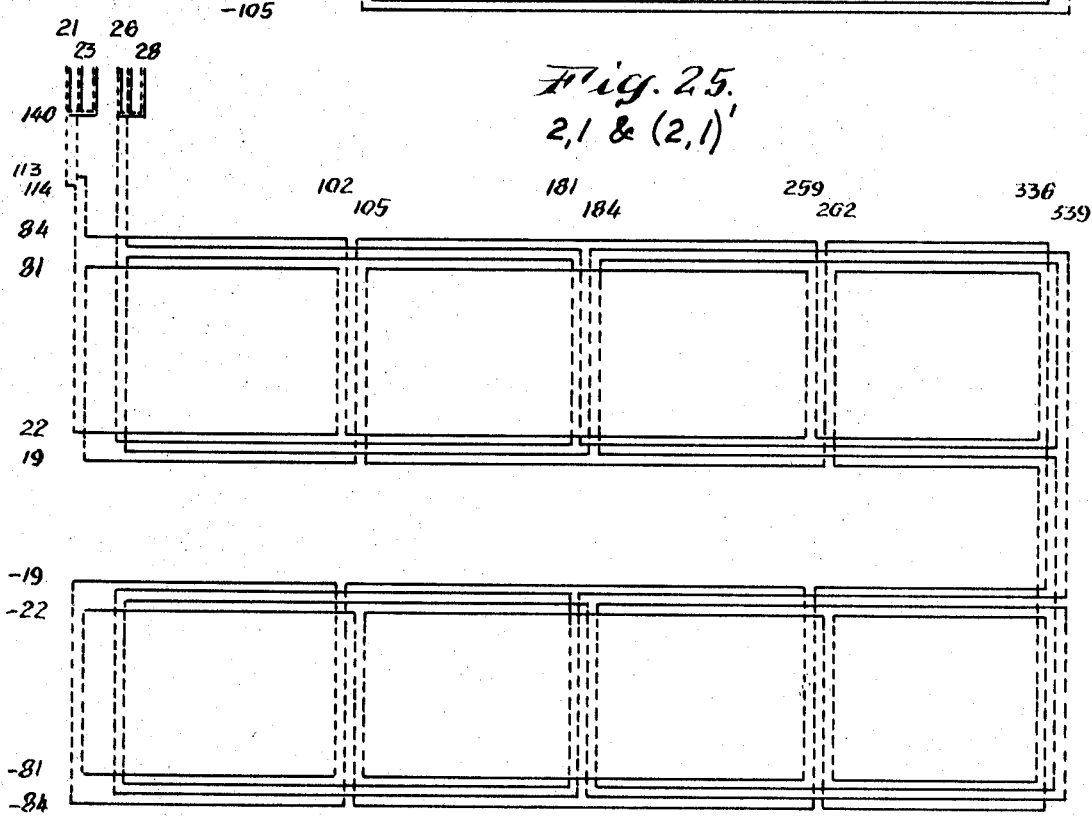

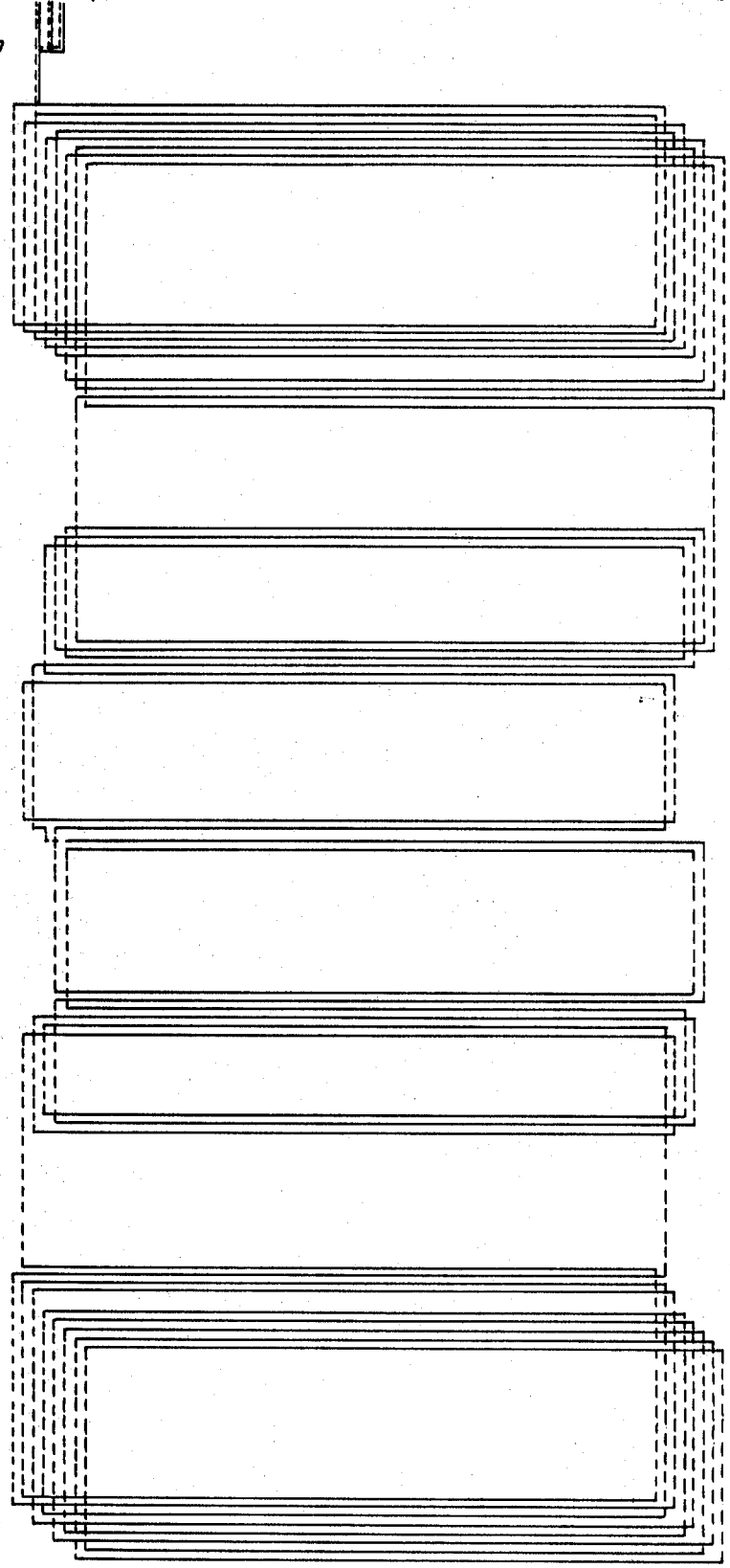

4,1 & (4,1)'

4,2 & (4,2)'

NUCLEAR MAGNETIC RESONANCE APPARATUS

This invention relates to nuclear magnetic resonance (NMR) apparatus adapted for analyzing substances by NMR techniques and more particularly to means for improving the uniformity of a magnetic field established by such apparatus.

NMR techniques have been employed in apparatus which function to identify a substance by an atomic analysis of the substance. In general, a sample under investigation is positioned in a relatively intense polarizing magnetic field and the Larmour frequency of the atomic nucleus of the substance is determined in one form of apparatus by superimposing a less intense alternating magnetic field of varying frequency and sensing the frequency of sample resonance. The gyromagnetic ratio of a sample element is then determinable from a knowledge of the intensity of the magnetic field and the Larmour frequency. Identification of the particular element and isotope can therefore be realized.

Microanalytical apparatus of the NMR type require a highly homogeneous polarizing field in the space occupied by the test sample in order that an accurate identification of the nuclei can be made. Nonuniformities in the field of an order as small as $10^{-6}$ can interfere with accurate identification. Prior NMR arrangements have employed field correcting current carrying electroconductors, also termed field homogenizing or shim coils which generate corrective fields for improving field uniformity in the vicinity of the sample. The shim coils have previously taken the form of discs mounted on the pole faces of a permanent or electromagnet. Means are provided for adjustment by the instrument operator of the amplitude of current flowing in the coils. In order that homogenization of the field may be established by the instrument operator with facility, and in order to provide a sufficient degree of field homogenization, it is recognized that the individual shim coils should be orthogonally related in that the corrective fields generated by the coils are independent, and, the coils should provide a relatively large number of order of correction. Orthogonality has been accomplished by arranging a winding in a manner for providing that current flowing therein generates an incremental magnetic field representable by a spherical harmonic of particular degree $n$ and order $m$. Suitable homogenization is accomplished by providing a plurality of such windings corresponding to differing degrees and others. An arrangement of this type is disclosed in my copending U.S. Pat. application Ser. No. 733,522, filed on May 31, 1968.

In a particular NMR apparatus the polarizing field is established by a superconductive coil. Superconductivity advantageously provides a polarizing field having an intensity substantially greater than can be realized with present day permanent or electromagnet arrangements. The superconductive coil is generally arranged as a solenoid and is positioned in a housing along with cryogenic means for establishing a required low operating temperature. This housing defines an annular opening extending therethrough and is exposed to room temperature and pressure. The solenoid is arranged for establishing a polarizing field in this opening and a sample to be analyzed is positioned in this field. Homogenizing of the polarizing field is not readily accomplished with the disc type of homogenizing coil referred to hereinbefore because of the physical arrangement of the superconducting field generating coil. Homogenizing coils in an NMR instrument of this type have been formed as a plurality of wire wound coils mounted on a tubular support form which is itself positioned within the annular opening and about the test sample. The coil support form then extends in the direction of the main polarizing field component. A relatively high degree of field homogeneity requires a relatively large number of wire wound coils. However, the provision of a relatively large number of such wire wound homogenizing coils results in an arrangement which is relatively bulky. In addition, the coils are difficult to fabricate, relatively difficult to accurately align, and the assembly is relatively expensive. For practical reasons then, the number of coils is thereby limited and the degree of homogenization provided by such a wound coil assembly is less than desirable.

Accordingly, it is an object of this invention to provide an improved arrangement for homogenizing the polarizing field of an NMR instrument.

Another object of the invention is to provide an improved field homogenizing arrangement wherein the coils are positioned about a sample under analysis.

Another object of the invention is to provide an improved field homogenizing arrangement in an NMR instrument utilizing a superconductive field establishing means.

A further object of the invention is to provide a printed circuit homogenizing coil arrangement wherein the coils are positioned about a sample under analysis.

In accordance with the general aspects of this invention, parallel positioned arcuate segments of homogenizing coils are positioned on one surface of a printed circuit board which is formed in a manner for positioning about a test sample. Rectilinear segments extending in a perpendicular direction to the arcuate segments are formed on the other, i.e., opposite surface of the printed circuit board. The segments on opposite sides of the printed circuit board are connected in a manner for providing that a plurality of electrically separate and orthogonally related coils are formed for establishing corrective incremental fields which can be represented by spherical harmonic functions. In one arrangement, the printed circuit board is formed for positioning in an annular opening of a housing of a superconductive field establishing means and about the test sample while in an alternative arrangement, the board is fabricated with conductors which become superconductive at relatively low temperatures and is positioned adjacent the superconductive solenoid and operated at substantially the same cryogenic temperature as the solenoid.

In accordance with another feature of this invention the printed circuit board is formed of a material which renders the board flexible and is rolled into a scroll configuration. The rectilinear segments providing current return paths are arranged on the printed circuit board in a manner for overlaying associated current return paths thereby cancelling undesired fields created by the current return paths in the direction of the main polarizing field.

These and other objects and features of the invention will become apparent with reference to the following specifications and the drawings wherein.

Figure 8A:
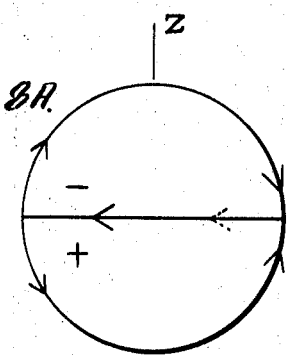
Figure 8B:
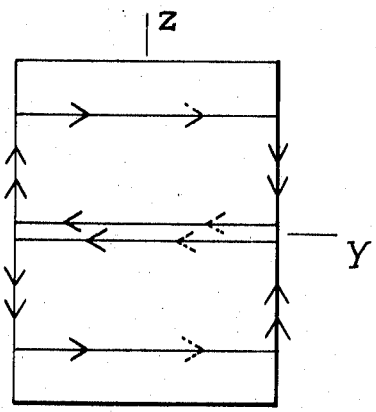
Figure 8C:
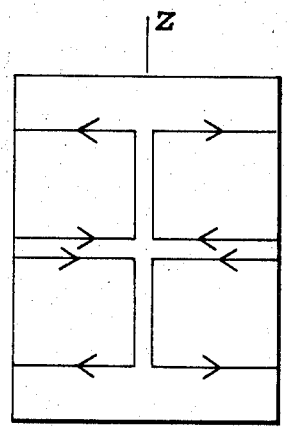
Figure 8D:
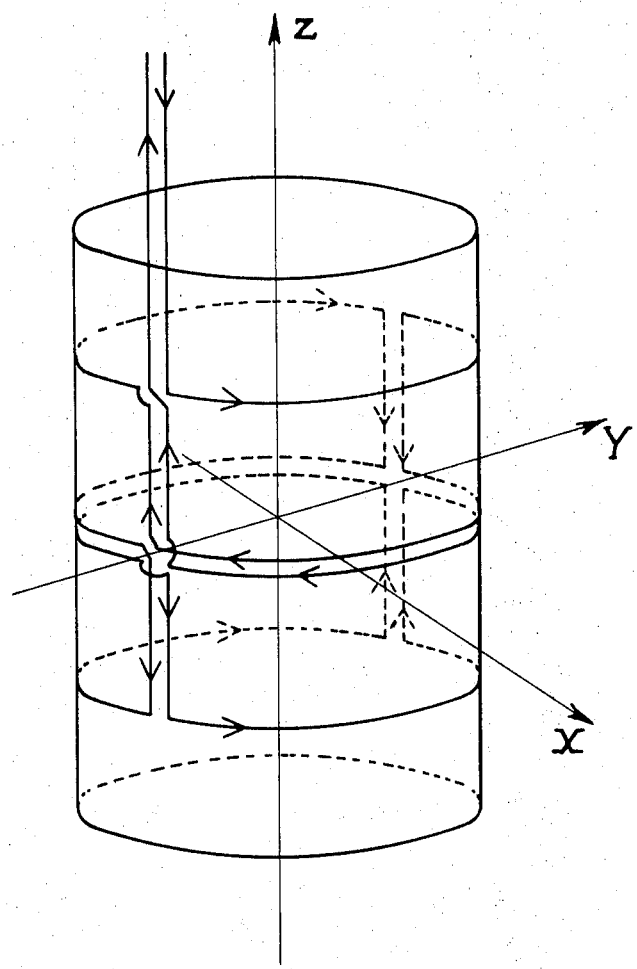
Figure 32:
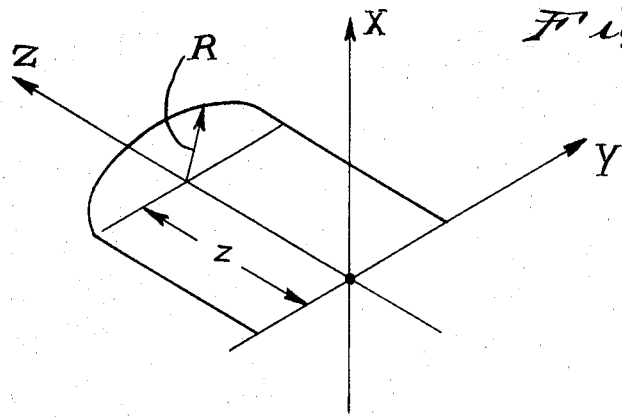
Figure 33:
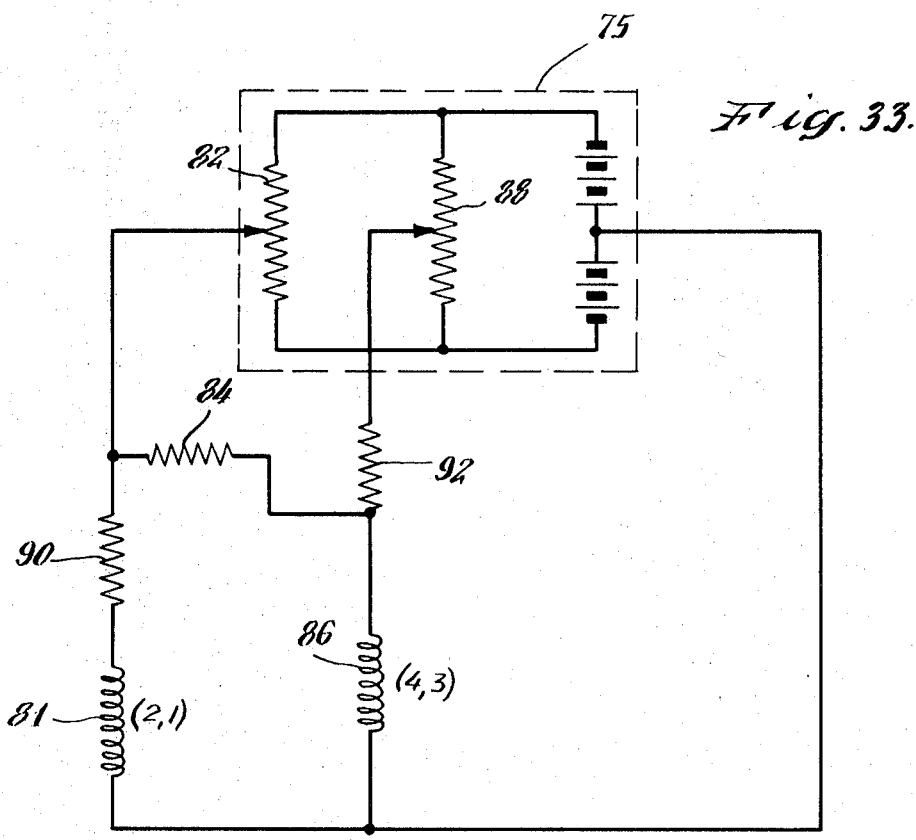

FIGS. 3A—19A illustrate the locus of a spherical harmonic function, $n$, $m$, of a particular degree $n$ and order $m$ on a sphere at those points where the function vanishes;

FIGS. 3B through 19B illustrate the projection of the locus from an associated sphere of FIGS. 3A through 19A on the surface of a cylindrical body positioned about the sphere;

FIGS. 8C—19C illustrate a left side elevation view of the associated cylindrical body of FIGS. 8B—19B;

FIG. 8D is a perspective and more detailed view of the cylinder of FIG. 8B illustrating the meaning of the double arrows and connections of FIGS. 8B—19B;

FIGS. 20, 21, 22, 23, 24, 25, 26, 27, 28, 29, 30 and 31 illustrate flat coil configurations which when rolled into the desired configuration will establish the incremental fields corresponding to spherical harmonic functions 1,0; 2,0; 3,0; 4,0; 5,0; 2,1; 2,1'; 3,1; 3,1'; 3,2; 3,2'; 4,1; 4,1'; 4,2; 4,2'; and 4,3; 4,3' respectively, which will be discussed in detail subsequently;

FIG. 32 is a diagram illustrating a building block configuration for generating incremental fields corresponding to tesseral (i.e., $m \geqq 1$) harmonic functions; and FIG. 33 is a diagram illustrating a circuit for cancelling ancillary harmonics not cancelled by spacing of the electroconductors.

An inhomogeneity at a point in the polarizing field of an NMR instrument can be expressed as the sum of incremental fields at the point, each of which is representable by a spherical harmonic. As is well known, a spherical harmonic is a function representing a particular solution of the Laplacian where $\nabla^2 H_z = 0$. If a multiplicity of electrical conductors is provided each of which when traversed by electric current produces an incremental field with a component parallel to the main field which is expressed substantially by a spherical harmonic which is specific for this conductor, then it is possible to decrease the inhomogeneities in the initial field by means of substantially orthogonal (i.e., independent) current controls. Although for ease of description an electroconductor is referred to in the specifications as generating a spherical harmonic, it will be understood that the current carrying electroconductor establishes a magnetic field in the Z direction as well as, more generally, magnetic potentials which are expressable as spherical harmonics.

The several spherical harmonic functions $n$, $m$ describing various incremental fields parallel to the main field are of the following degree $n$ and order $m$, it being noted that the tesseral harmonics occur in pairs and the second of the pair is distinguished from the first of the pair by a prime symbol: 1,0: 2,0; 3,0; 4,0; 5,0; 2,1; 2,1'; 3,1; 3,1'; 3,2; 3,2'; 4,1; 4,1'; 4,2; 4,2'; 4,3 and 4,3'. Corrective fields corresponding to these spherical harmonics are provided in accordance with the present invention by means of homogenizing coils which are formed in a manner described in detail hereinafter.

Figure 1:
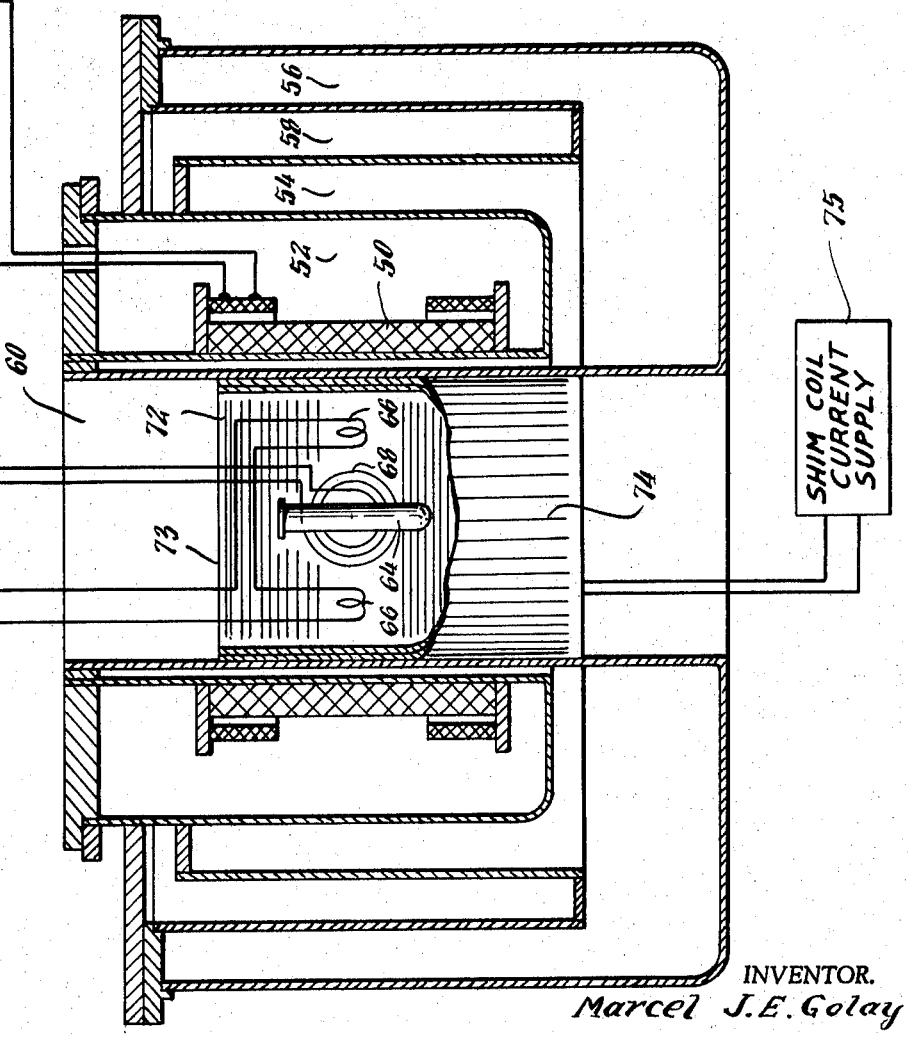
FIG. 1 is a diagram illustrating an NMR apparatus including superconductive means for establishing a polarizing field and having a field homogenizing arrangement fabricated in accordance with features of this invention.

Referring now to FIG. 1, a superconductive NMR instrument is shown to include a superconductive solenoid 50 positioned in an enclosed chamber 52. The chamber 52 contains a coolant such as liquid helium for maintaining the solenoid 50 at a temperature sufficiently low for establishing superconductive effects in the solenoid. Chambers 54 and 56 surround chamber 52 and are evacuated to relatively low pressures in order to reduce thermal conduction between the chamber 52 and the surrounding atmosphere. In addition, an intermediate chamber 58 is provided and contains a coolant such as liquid nitrogen for establishing an intermediate relatively low temperature. This chamber assembly which is fabricated of a nonmagnetic material such as aluminum forms a housing defining an annular opening 60 extending through the housing. The solenoid 50 is positioned about this opening and establishes a polarizing field therein. A source of electric energy 62 is provided for exciting the superconductive solenoid 50.

A sample under analysis is deposited in a sample vessel 64 which is positioned within the annular opening 60 and is thereby subjected to the polarizing field of the solenoid. The vessel is supported by any suitable means which for purposes of clarity in the drawing is not illustrated. An RF generator 65 and field coils 66 establish an alternating magnetic field of varying frequency about the sample. When the sample is irradiated at the Larmour frequency, gyromagnetic resonance occurs and is sensed by a pickup coil 68 which is coupled to a receiver and indicator 70 for amplification and recording.

Homogenization of the polarizing field in the vicinity of the sample is provided by shim coils positioned about the sample. These coils include a plurality of parallel arcuate conductive segments 72 positioned on one side of an insulating board 73 and a plurality of rectilinear conductive segments 74 arranged perpendicular to the segments 72 and positioned on an opposite side of the board. Apertures are formed in the board and connections are made between segments on opposite sides of the board by plating these apertures. A detailed configuration of the shim coils thereby formed is described in detail hereinafter. Homogenizing current is derived from a source 75.

Figure 2A:
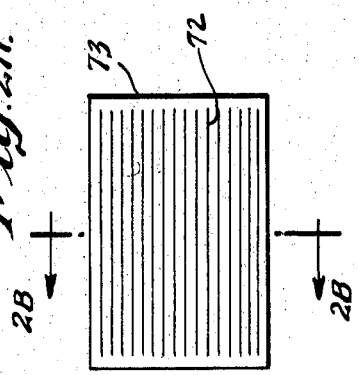
FIG. 2 is a diagram illustrating a printed circuit board for supporting field homogenizing windings.
Figure 2B:
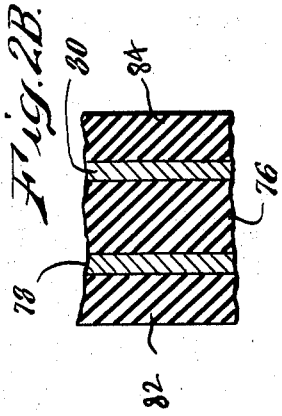
Figure 2C:
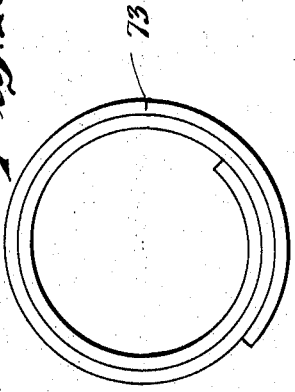

Fabrication of the coil assembly is best described with reference to FIG. 2. The board 73 is shown to initially comprise a relatively thin, flat, double-clad printed circuit board including an insulating support material 76 and adhering surfaces 78 and 80 formed of a relatively thin metallic surface such as copper and from which the segments 72 and 74 respectively are formed. These conductive segments are formed by etching or in accordance with well-known printed circuit techniques. The dimensions of the board as illustrated in the sectional view of FIG. 2b are greatly exaggerated for clarity. Relative thickness of the support 76, the conductive surfaces 78 and 80, and two thin insulating sheets 82 and 84 are chosen in order to provide that the flat board can be deformed or rolled into a scroll configuration as illustrated in FIG. 2c. The segments 72 although initially rectilinear become arcuate as the board is rolled into a scroll configuration. Additional copper can be added to the various conductive segments by plating in order to decrease the resistance thereof and accompanying dissipation of power when a current flows therein. The rolled scroll assembly is then positioned in the opening 60 and supported by any suitable means such as an epoxy adhesive.

I will now describe the generation of a plurality of shim coil configurations comprising the arcuate and rectilinear segments referred to and adapted for producing corrective magnetic fields having potentials which can be substantially described by spherical harmonics. Hereinafter each coil will be designated by a two-number code $(n, m)$ in which $n$ designates the degree of the potential produced by a particular coil and $m$ the order of the potential. In order to facilitate a description of the development of the coils as well as a particular embodiment thereof, the following four-step procedure will be utilized for the generation of each successive harmonic.

1. The algebraic expression for the various spherical harmonic potential functions will be given in terms of Cartesian coordinates, the Z axis corresponding to an axis of the opening 60. Any numerical factors usually found in these expressions will be disregarded since they will have no bearing on the generation of the particular winding.

2. A view in the yz plane of a theoretical sphere centered about the sample point will be given along with the locus at which the harmonic will vanish. These potential lines are the lines along which an electric current having a particular direction will substantially generate a particular harmonic. The hand rule for giving the direction of current is that of an observer walking on the sphere along the zero potential line. The observer will have a region of negative value of potential function on his right and a region of positive value on his left. Because of the finite dimensions of the potential lines the sphere, a particular line will generate not only the primary harmonic desired but also undesired ancillary harmonics which interfere with other harmonics being generated. These ancillary harmonics, of different degree and/or order than the primary harmonic, will be of a degree $n$ which may differ by an even number from the degree of the primary harmonic, and of an order $m$ which may be an odd multiple of the order of the primary harmonic.

3. The desired overall configuration of the plurality of windings approximates a cylinder as illustrated by the scroll-shaped printed circuit board of FIG. 2c. Preliminary current lines will then be formed on the walls of a theoretical cylinder and will be obtained by projecting the zero potential lines on the sphere from the sphere center onto a cylinder wall having the $z$ axis as its axis.

Since the projection of the poles of the sphere on the cylinder would be at infinity, the procedure just described will require that, whenever a single meridian passing through one of the sphere poles is projected, the projection will be interrupted at some point on the cylinder, and the line will be divided into two half-lines along two segments of a circle which reunite into one line on the opposite side of the cylinder, from which it resumes its travel on the interrupted meridian projection. Similar precautions will be taken when two or more meridians pass through one of the sphere poles, as will be made clear with the general examples given.

4. An example will be given of each group of conductive segments on the printed circuit board, which, when rolled, produce substantially the ideal conductors shown on the cylinder. As this fourth step is taken, it will be demonstrated how each of the segments mentioned above is embodied into a multiplicity of conductors, the number and location of which is taken into account to explain, a posteriori, the reasons for their selection with respect to the design of coils which exhibit a minimum of contamination from other harmonics.

In the embodiment of the coils to be described, the width of the conductive segments and allotted spacing between them is selected in order to provide, on the one hand, a large number of horizontal or vertical coil segments of reasonably low resistance per unit distance, while on the other hand providing a minimal probability of an electrical short between two adjacent coil segments. Typically a total spacing of .0125 inches between conductor centers is selected in the example to be described below for a cylinder 1¼ inches in diameter. Thus the horizontal segments which are rolled so as to form arcuate coil segments at various positions along the elongated coil form will be located at successive positions spaced .02 times the cylinder radius. This simple number facilitates the computations, and since the radius of the cylinder will be taken to be unity for the sake of mathematical convenience, the various arcuate coil segments of the rolled scroll will be located at positions .01, .03, .05, etc. above and below the median plane of the solenoid 50, which is defined as $z = 0$, where $z$ is the ordinate measured positively in the direction of the $z$-axis above said median plane, or negatively below.

The vertical lines on the coil form shown as dotted lines in FIGS. 20—31, represent the vertical segments of the conductors on the rolled scroll, and they are allotted the same spacing, .0125 inch as the horizontal segments.

The vertically aligned numbers shown in FIGS. 20—31 designate the positions or ordinate locations the horizontal lines occupy on the form. These lines then become arcuate segments on the rolled scroll. The ordinate of the conductors preceded by a minus (−) sign indicate locations below the median plane. Since a numerical spacing of .02 was allotted these as explained earlier, these numbers multiplied by .02 with .01 subtracted will be the locations of the successive conductors.

Likewise, these numbers shown to designate the circumferential positions of the vertical lines on the scroll and between which the arcuate segments extend will be the abscissa numbers of the allotted positions on the flat unrolled form. The value 3.14 will be taken for $\pi$, so that, since the spacing allotted these vertical conductors is also .02 times the cylinder radius, the numbers 315 and 629 will represent the positions of vertical conductors which, in the rolled scroll, are superposed and overlay on position number 1, so that currents in two of these conductors flowing in opposite directions will cancel their effects.

The zonal harmonic of first degree, 1,0, has the algebraic form $\Phi = z$. This harmonic is the only noncorrecting harmonic, representing as it does an incremental $H_z$ field component designed, when desired, to sweep the NMR spectrum instead of doing it with a frequency change.

Figure 3A:
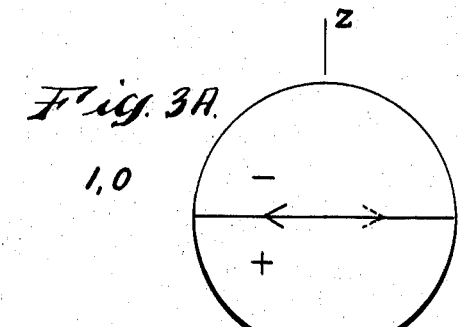
Figure 3B:
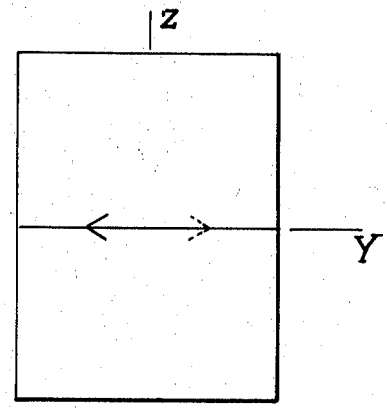

FIG. 3a illustrates the single turn coil on the unit sphere which serves to generate this harmonic, and FIG. 3b illustrates the projected coil on a cylindrical surface. In FIG. 3a and 3b, as in the subsequent similar FIGS., the dotted arrows indicate the current direction on the other side of the sphere or cylinder. The sign of the harmonic on the side of the sphere in the positive $x$ direction is given in FIG. 3a and will be given in all subsequent $a$ FIGS.

Figure 20:
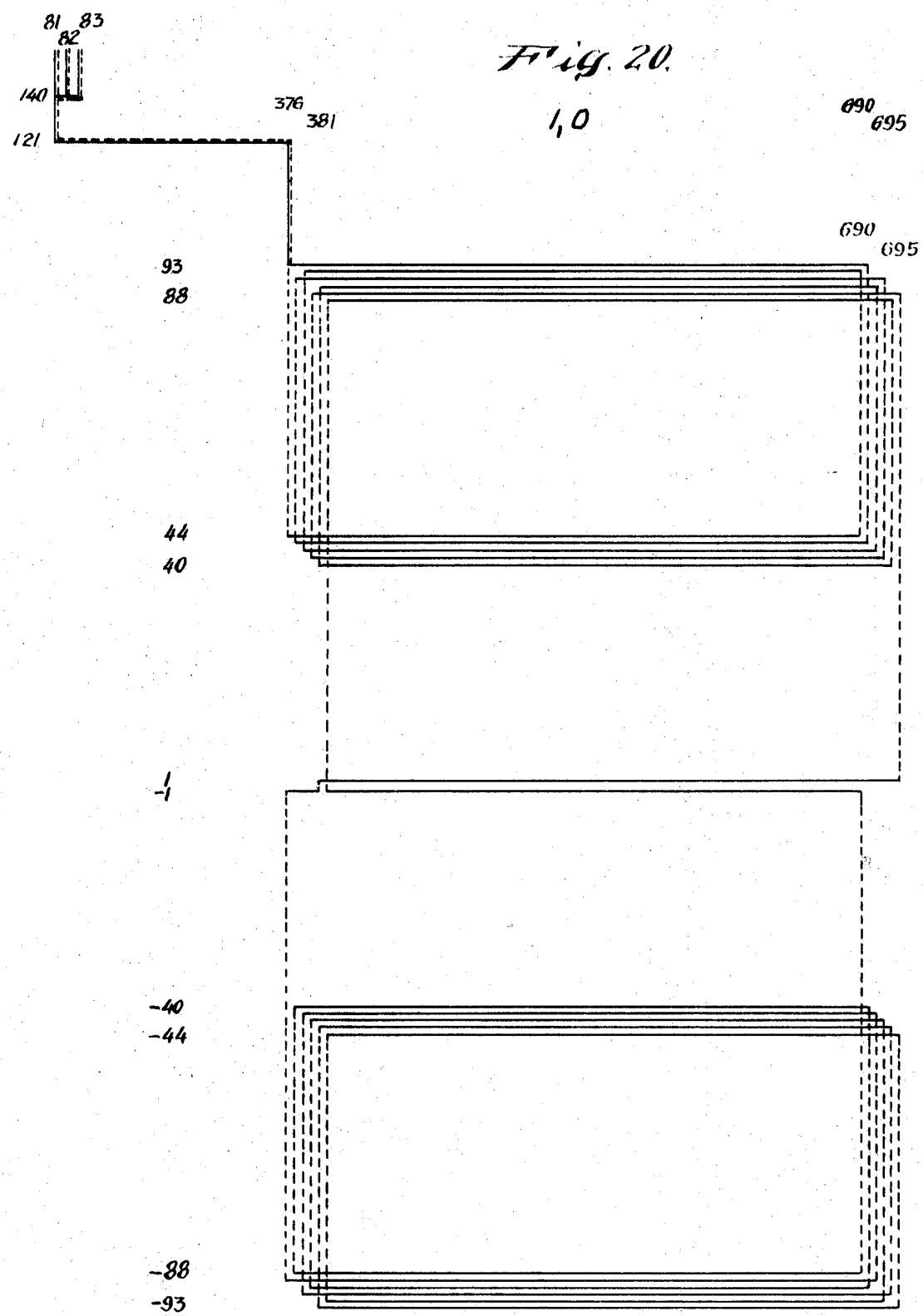

FIG. 20 illustrates, not to scale, a winding on the scroll designed to produce a 1,0 harmonic. A plurality of consecutive abscissa positions are established on printed circuit board 73 which designate the extension from left to right (FIGS. 1 and 2a) of an arcuate segment 72. These positions are spaced by integral units extending from 1 to 314 for a first turn of the scroll, from 315 to 628 for a second turn of the scroll, and above 628 for portions of a third turn of the scroll. Similarly, positive ordinate portions are established which designate the extension of rectilinear segments 74 (FIG. 1) in a positive direction and in a negative direction with reference to a median plane designated 0. As will also be the case for all subsequent harmonics the single equatorial loop of FIGS. 3a and 3b represent arcuate segments 72 and are embodied into several loops; for this case they are located at ordinate stations 1, 40, 41, 42, 43 and 44 both above and below the median and extend between the abscissa stations indicated in FIG. 20. In all cases requiring loops or circular segments falling on the equator, a compromise will be struck and these windings will be placed in noninterfering locations about the median, with due consideration for minimization of the contamination of other harmonics. Also, appropriate current return paths have been provided for each loop by rectilinear segments 74 at the ordinate stations 88 through 93, and abscissa stations 376 through 381 and 690 through 695, as required by the condition that all windings be complete on the scroll before rolling, and that no connections be made between adjacent layers of the rolled scroll. These return loops represented by dashed lines in FIG. 20 have a negligible cancelling effect on the main $\Phi = z$ harmonic in the neighborhood of the origin, but their position has been calculated to minimize the contamination of the 3,0 harmonic, as will be discussed subsequently.

The zonal harmonic of second degree, 2,0, has the algebraic form:

$$\Phi = 2z^2 - x^2 - y^2$$

Figure 4A:
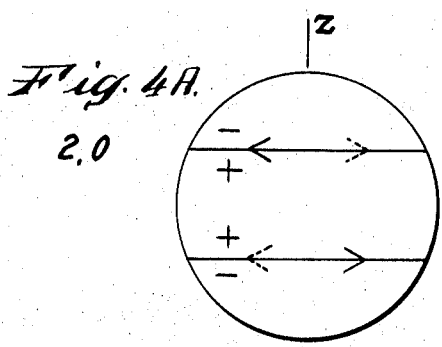
Figure 4B:
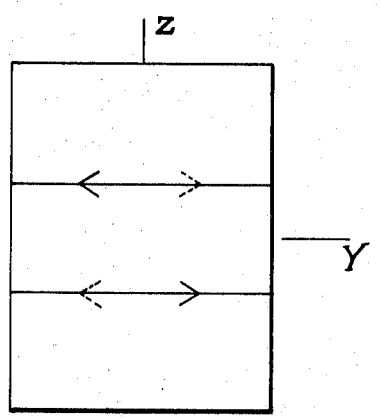
Figure 21:
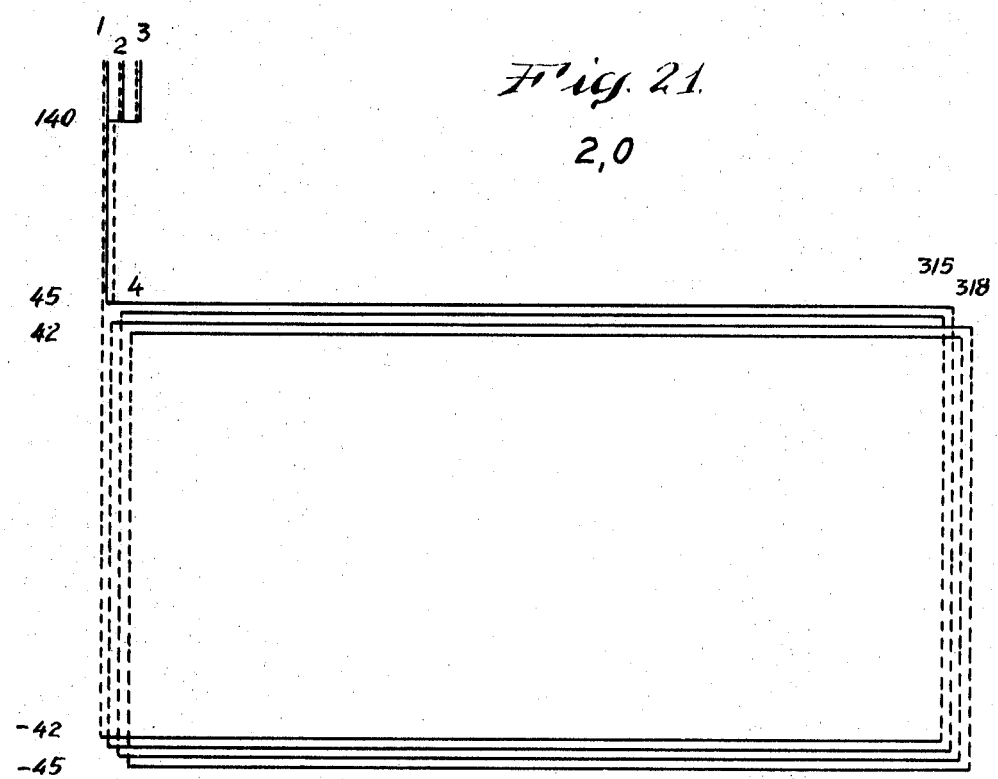

The current lines generated by it on the unit sphere are illustrated by FIG. 4a, while FIG. 4b illustrates their projection on the unit cylinder. FIG. 21 illustrates the embodiment of this coil on the scroll, in which four turns are allotted to each current line of FIG. 4a.

The zonal harmonic of third degree, 3,0, has the algebraic form:

$$\Phi = 2z^3 - 3z(x^2 + y^2)$$

Figure 5A:
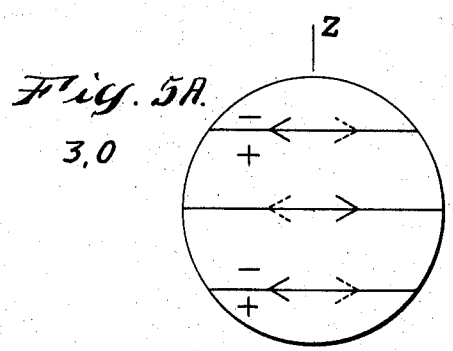
Figure 5B:
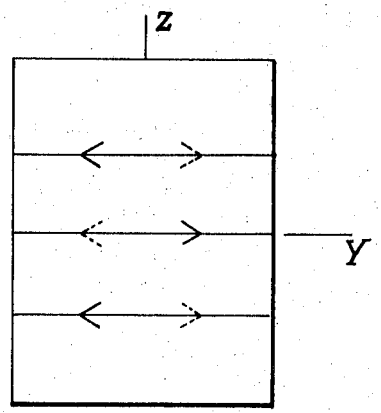

The current lines generated by it on the unit sphere are illustrated by FIG. 5a, and their projections on the unit cylinder are illustrated by FIG. 5b. FIG. 22 illustrates the embodiment on the developed scroll of the coil of FIG. 5b.

The zonal harmonic of the fourth degree, 4,0, has the algebraic form:

$$\Phi = 8z^4 - 24z^2(x^2 + y^2) + 3(x^2 + y^2)$$

Figure 6A:
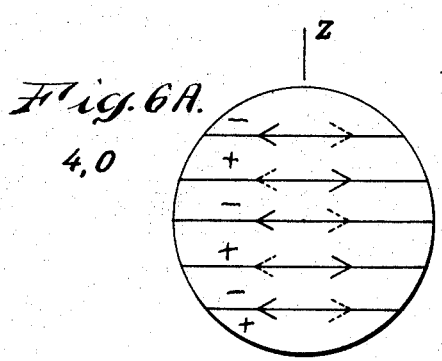
Figure 6B:
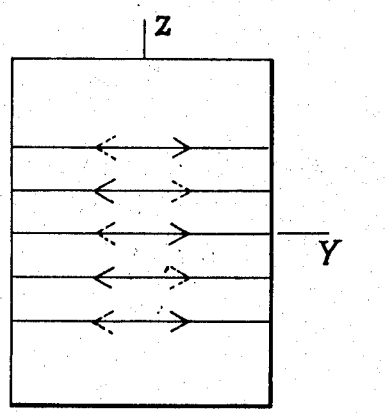
Figure 23:
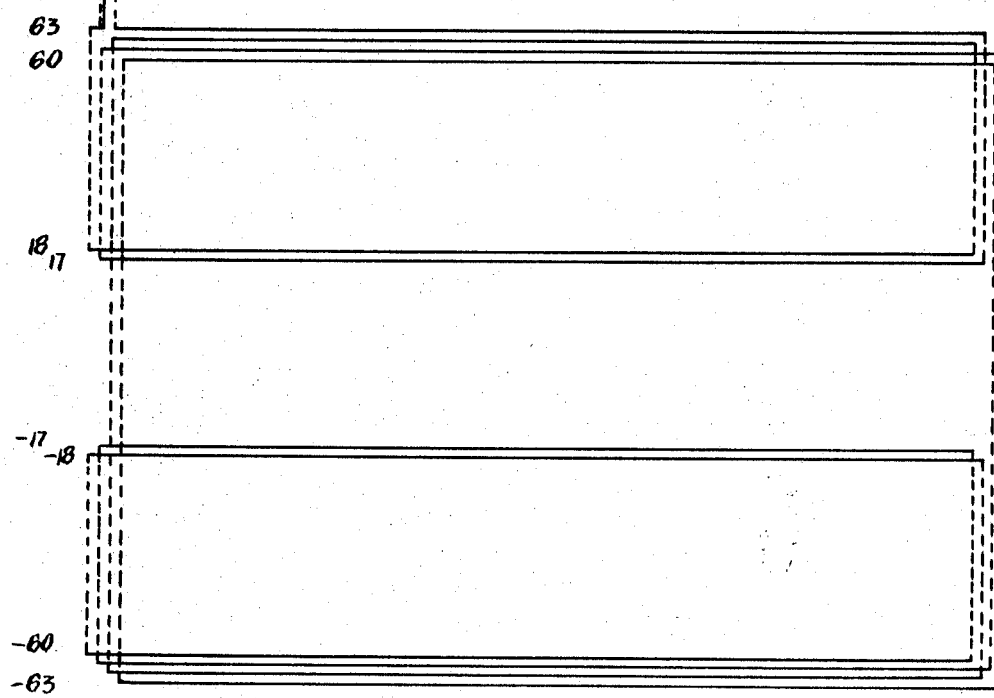
Figure 26:
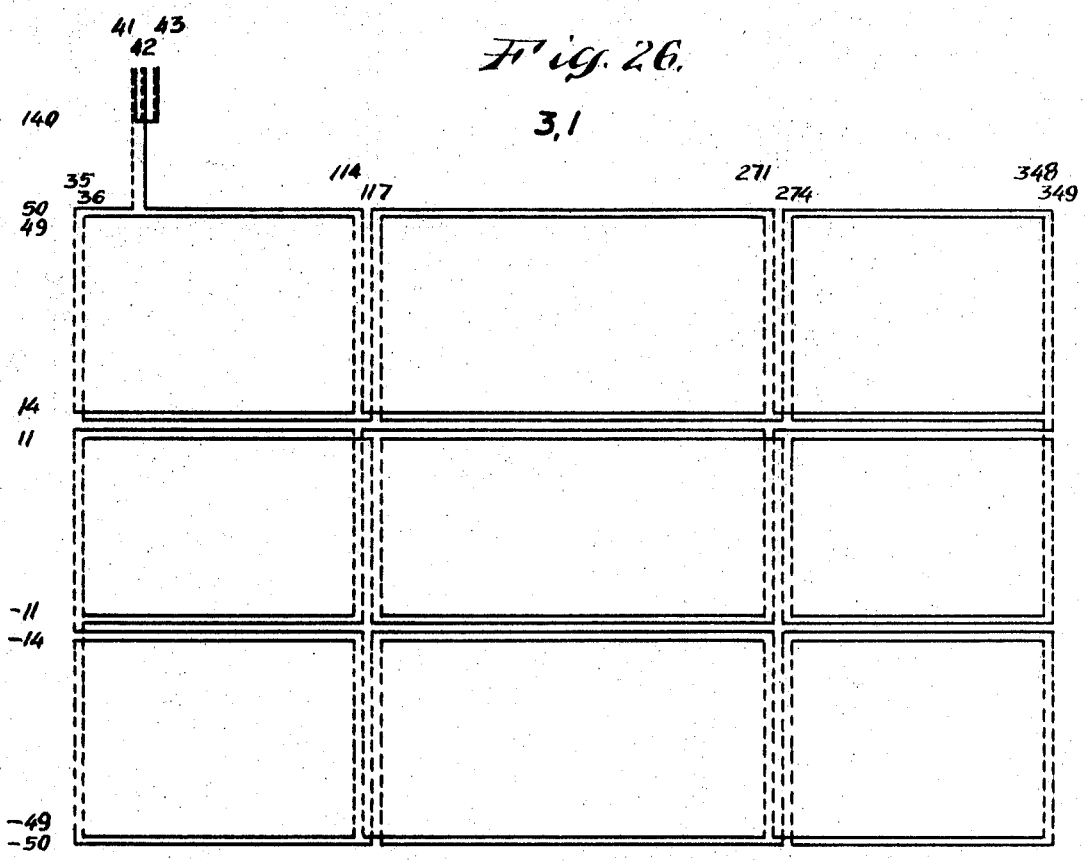
Figure 27:
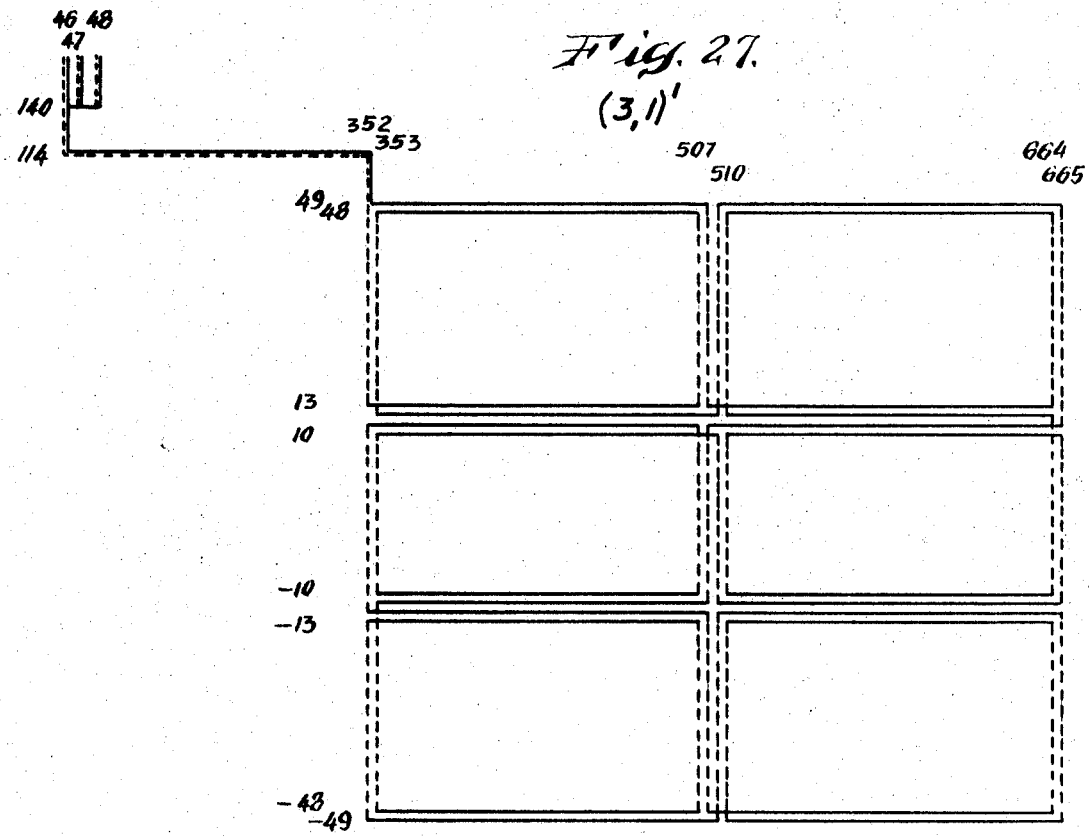

The unit current lines it defines on the unit sphere are illustrated by FIG. 6a, while the projected current lines are illustrated by FIG. 6b. FIG. 23 illustrates the scroll embodiment of FIG. 6b.

The zonal harmonic of the fifth degree, 5,0, has the algebraic form:

$$\Phi = 8z^5 - 40z^3(x^2 + y^2) + 15z(x^2 + y^2)^2$$

Figure 7A:
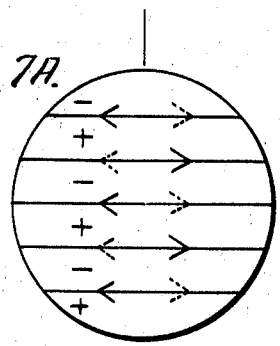
Figure 7B:
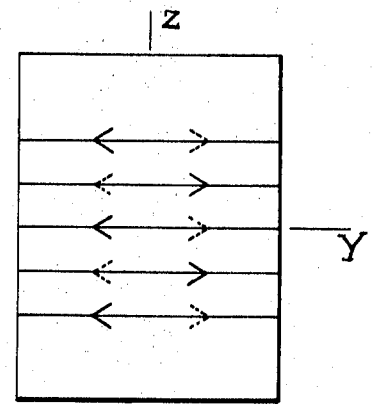

The corresponding unit current lines are illustrated by FIG. 7a, while FIG. 7b illustrates the cylindrical projections. FIG. 24 illustrates the scroll embodiment.

The first tesseral harmonic of the second degree and of the first order, 2,1, has the algebraic form:

$$\Phi = xz$$

The unit current lines it defines on the unit sphere are illustrated by 8a. When the projection of the $\Phi$ is made on $z$ unit cylinder, considering the precaution mentioned hereinbefore, one obtains FIG. 8b in which double arrows indicate a double line which is split into two single lines with single arrows. FIG. 8c is a side view of FIG. 8b as viewed from the left and FIG. 8d is a perspective and more detailed view of FIGS. 8b and 8c illustrating the meaning of the double arrows and intersecting double-arrowed lines of FIGS. 8b and 8c. This explanatory FIG. will not be repeated subsequently as it explains well also the meaning of the double arrows and double-arrowed line intersections of the subsequent FIGS.

The second tesseral harmonic of the second degree and of the first order, 2,1', has the algebraic form:

$$\Phi = z$$

Figure 9A:
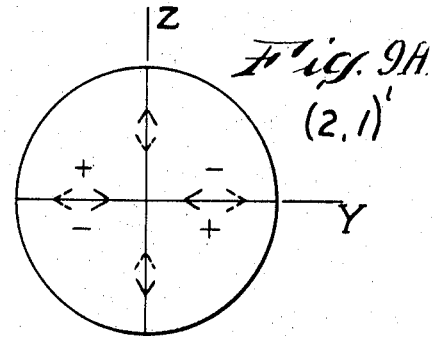
Figure 9C:
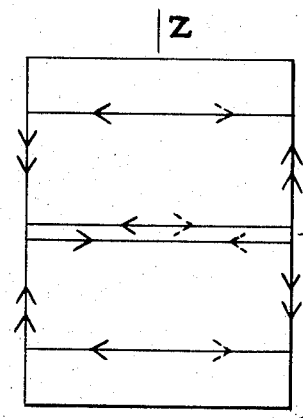
Figure 9B:
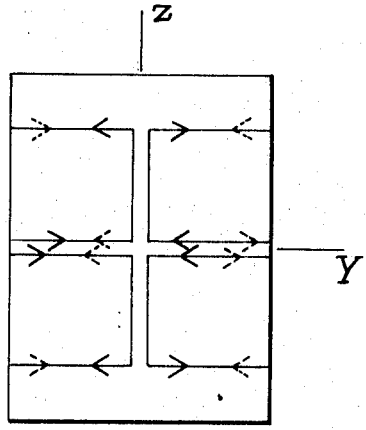

The unit current lines it defines on the unit sphere are shown in FIG. 9a, and FIG. 9b illustrates the projected lines on the unit cylinder. Again the precaution considered hereinbefore has been taken, and double arrows denote double lines which are split into two single lines which embrace the cylinder to reunite for the return toward the center as shown in FIG. 8d. As all subsequent harmonics define current lines which pass through the poles, the same precautions and double arrows will obtain in all cases without further mention. FIG. 9c is a side view of FIG. 9b. FIG. 25 illustrates the embodiments of FIGS. 8b and 9b on the scroll.

Figure 10A:
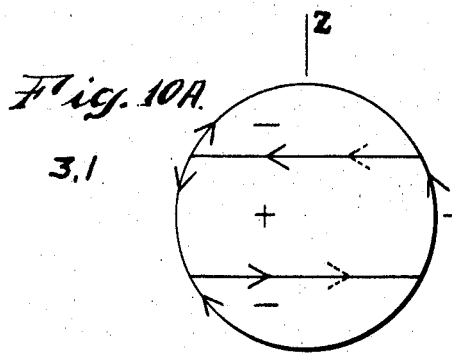
Figure 11A:
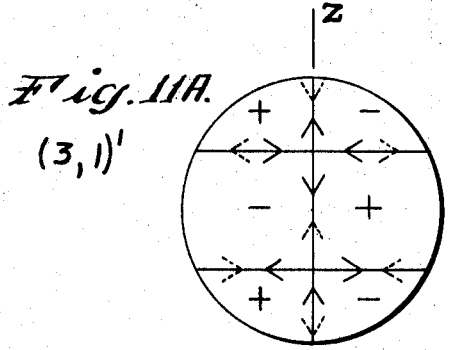

FIG. 10a illustrates the unit current lines defined on the unit sphere by the first tesseral harmonic of third degree and first order, 3,1, given by the expression:

$$\Phi = x(4z^2 - x^2 - y^2)$$

and FIG. 11a illustrates its twin, 3,1′, given by $$\Phi = y(4z^2 - x^2 - y^2).$$

Figure 10B:
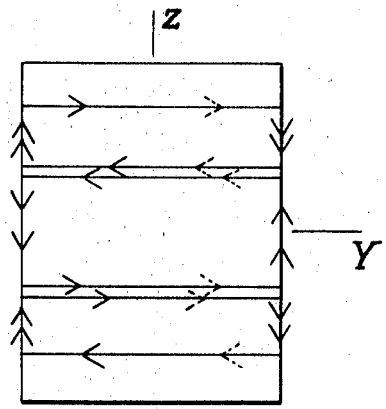
Figure 10C:
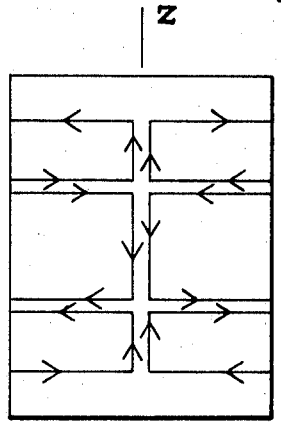
Figure 11B:
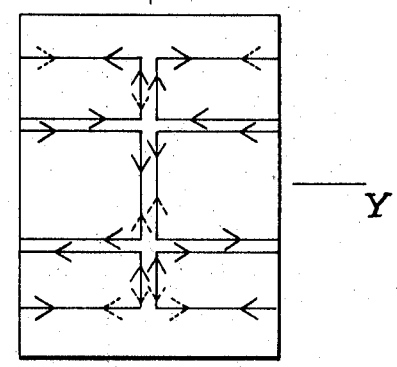
Figure 11C:
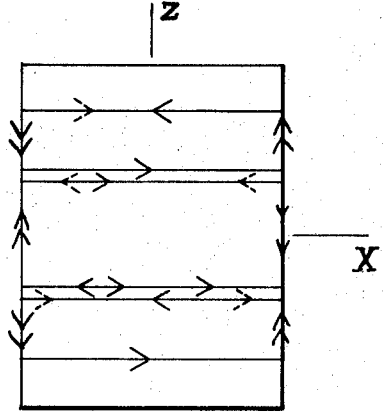

FIGS. 10b and 11b show the projected lines on the unit cylinder. FIGS. 10c and 11c are the respective side views of FIGS. 10b and 11b, and FIGS. 26 and 27 show the scroll embodiment of FIGS. 10b and 11b respectively.

Figure 12A:
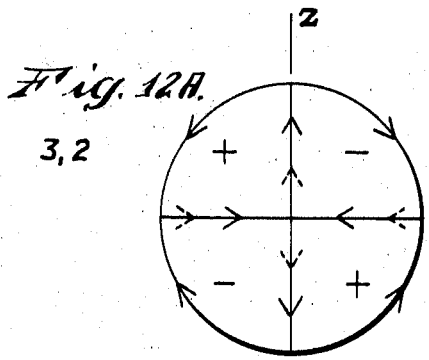
Figure 13A:
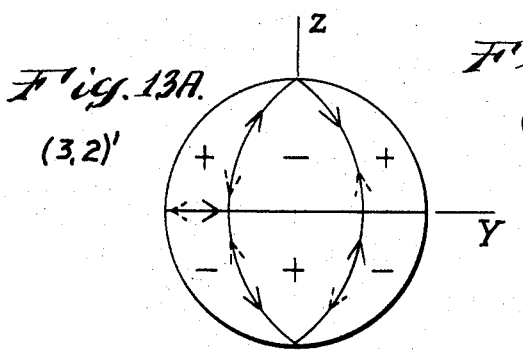

FIGS. 12a and 13a show the unit current lines of the respective harmonics 3,2, with the algebraic form:

$$\Phi = xyz$$

and 3,2′, with the algebraic form:

$$(x^2 - y^2) z$$

Figure 12B:
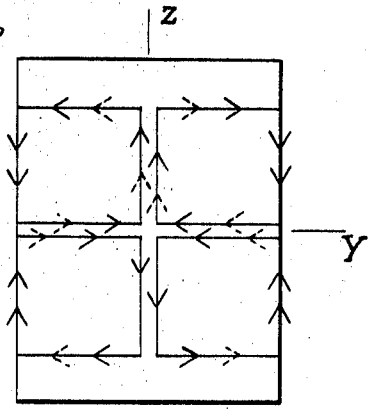
Figure 12C:
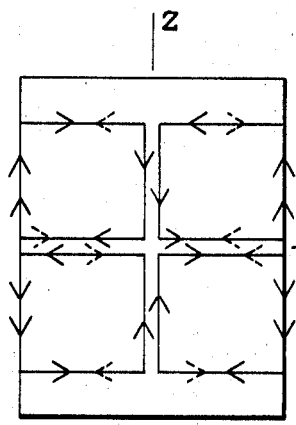
Figure 13B:
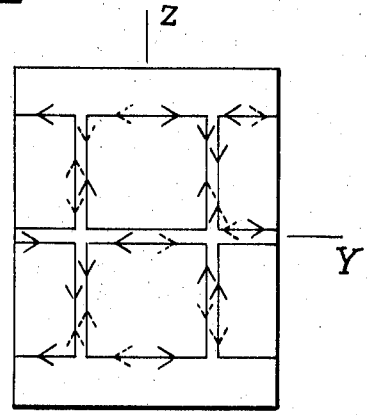
Figure 13C:
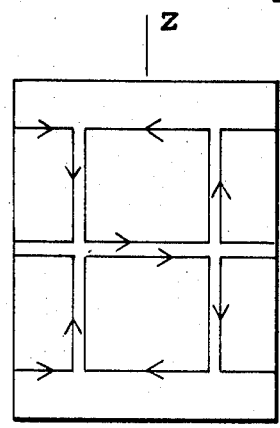
Figure 28:
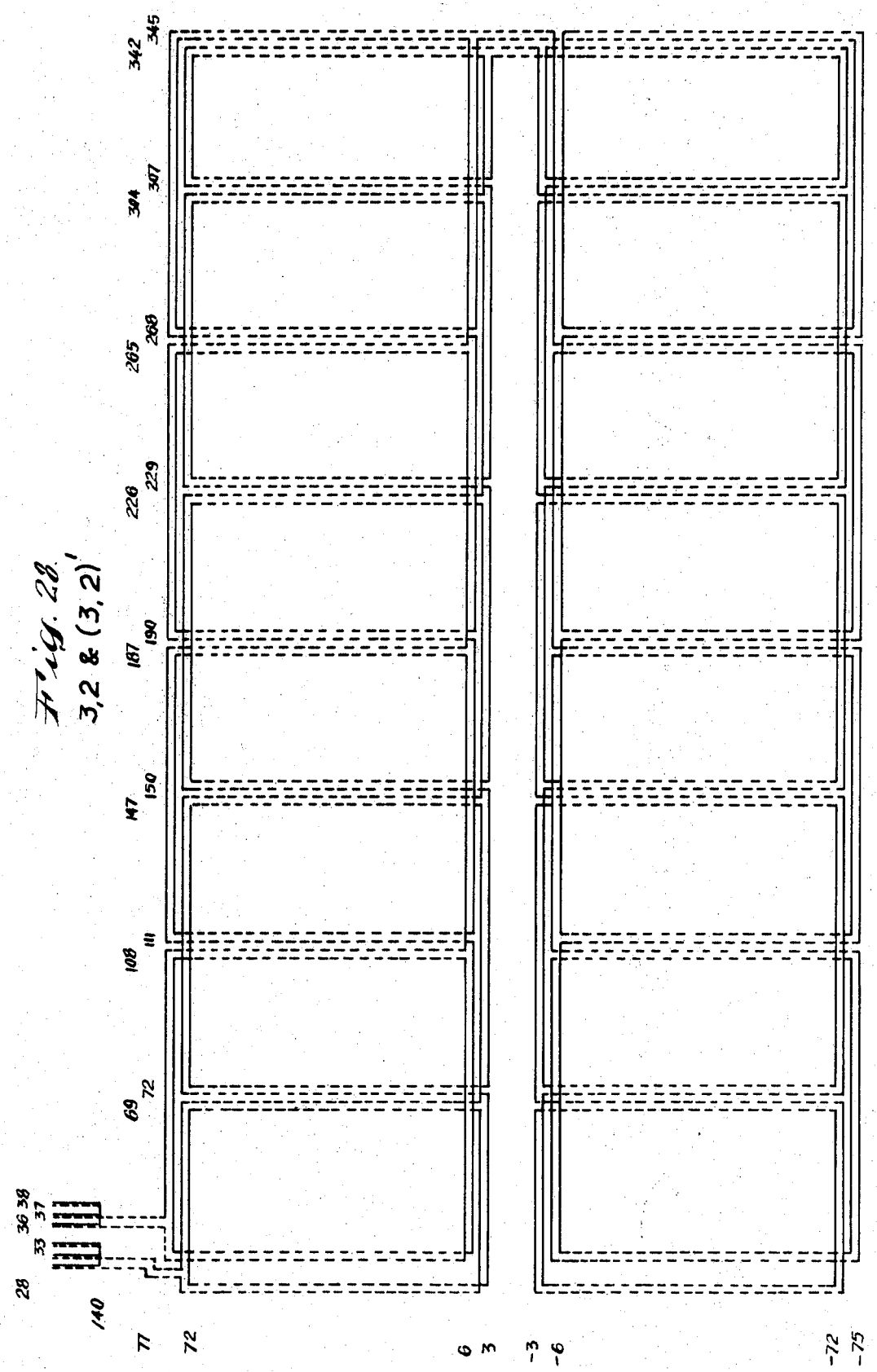

The respective projections are shown in FIGS. 12b and 13b, side viewed in FIGS. 12c and 13c respectively, and their scroll embodiments are shown in FIG. 28.

Figure 14A:
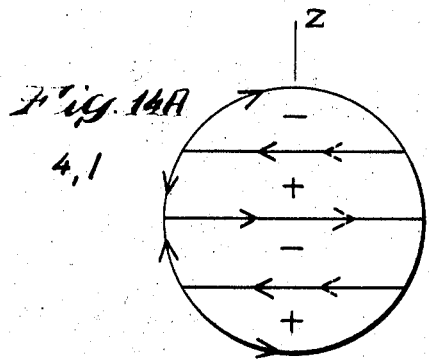
Figure 14B:
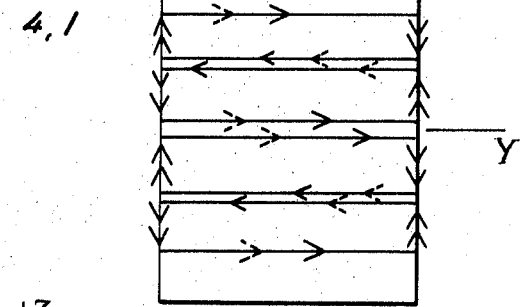
Figure 14C:
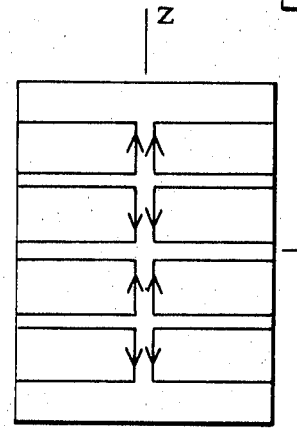
Figure 15A:
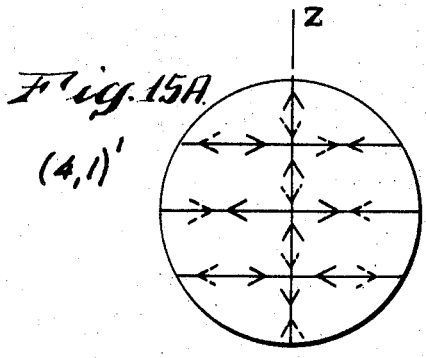
Figure 15B:
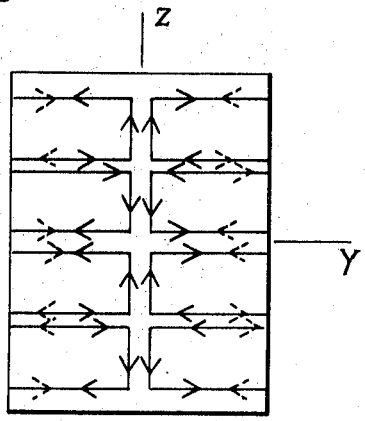
Figure 15C:
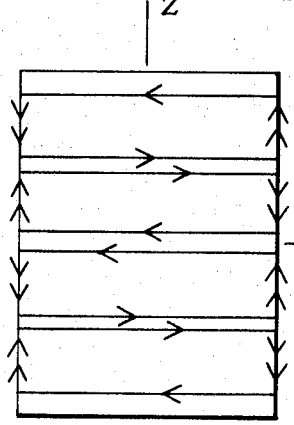
Figure 29:
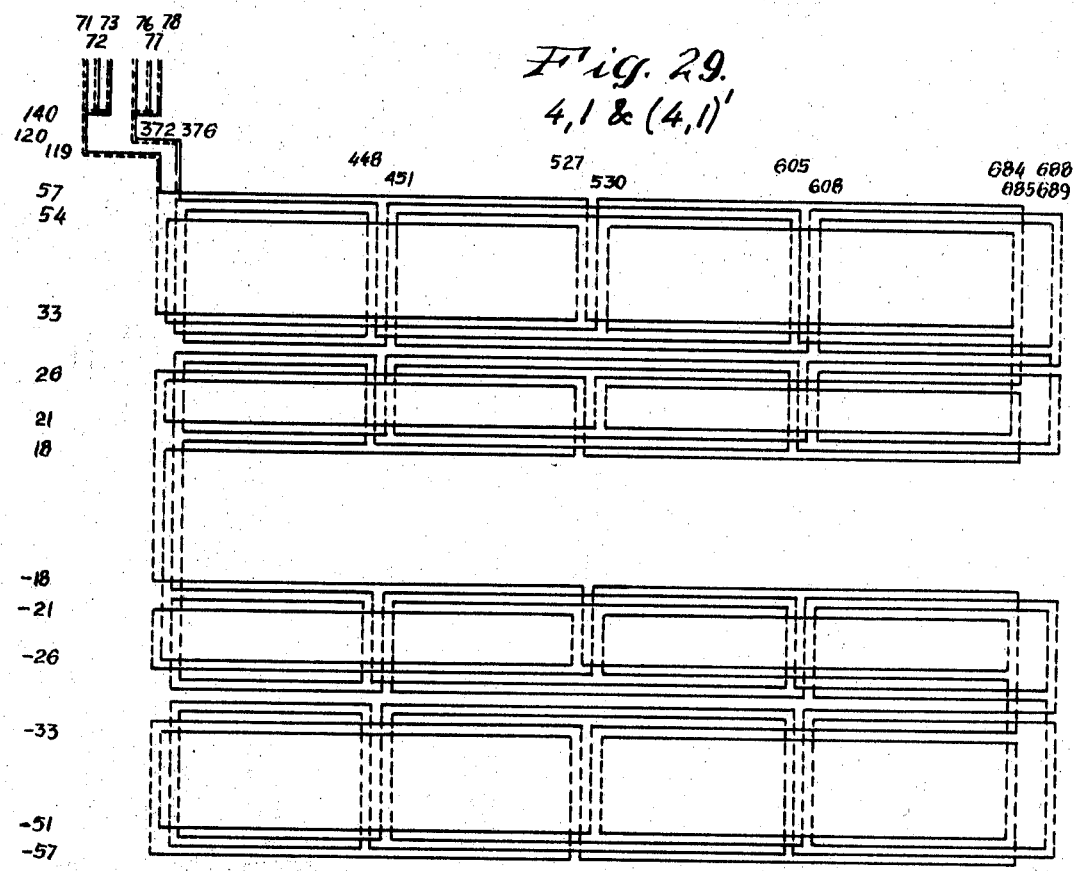
Figure 30:
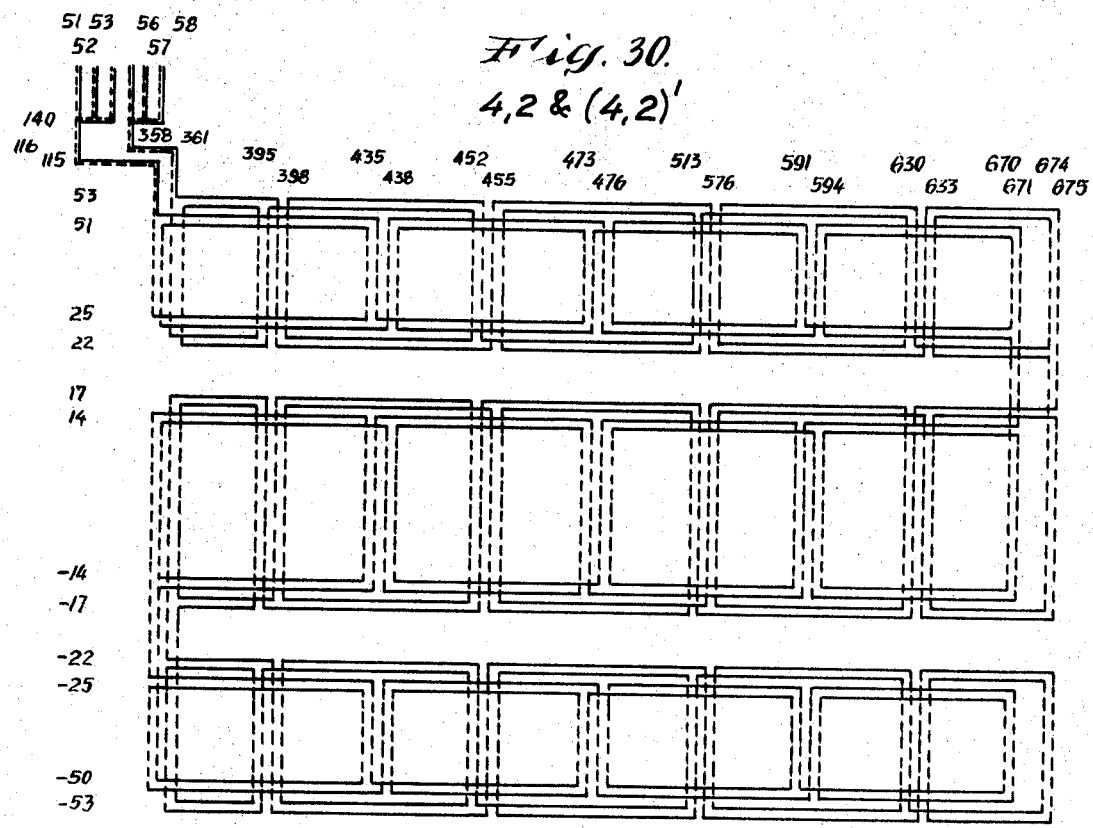
Figure 31:
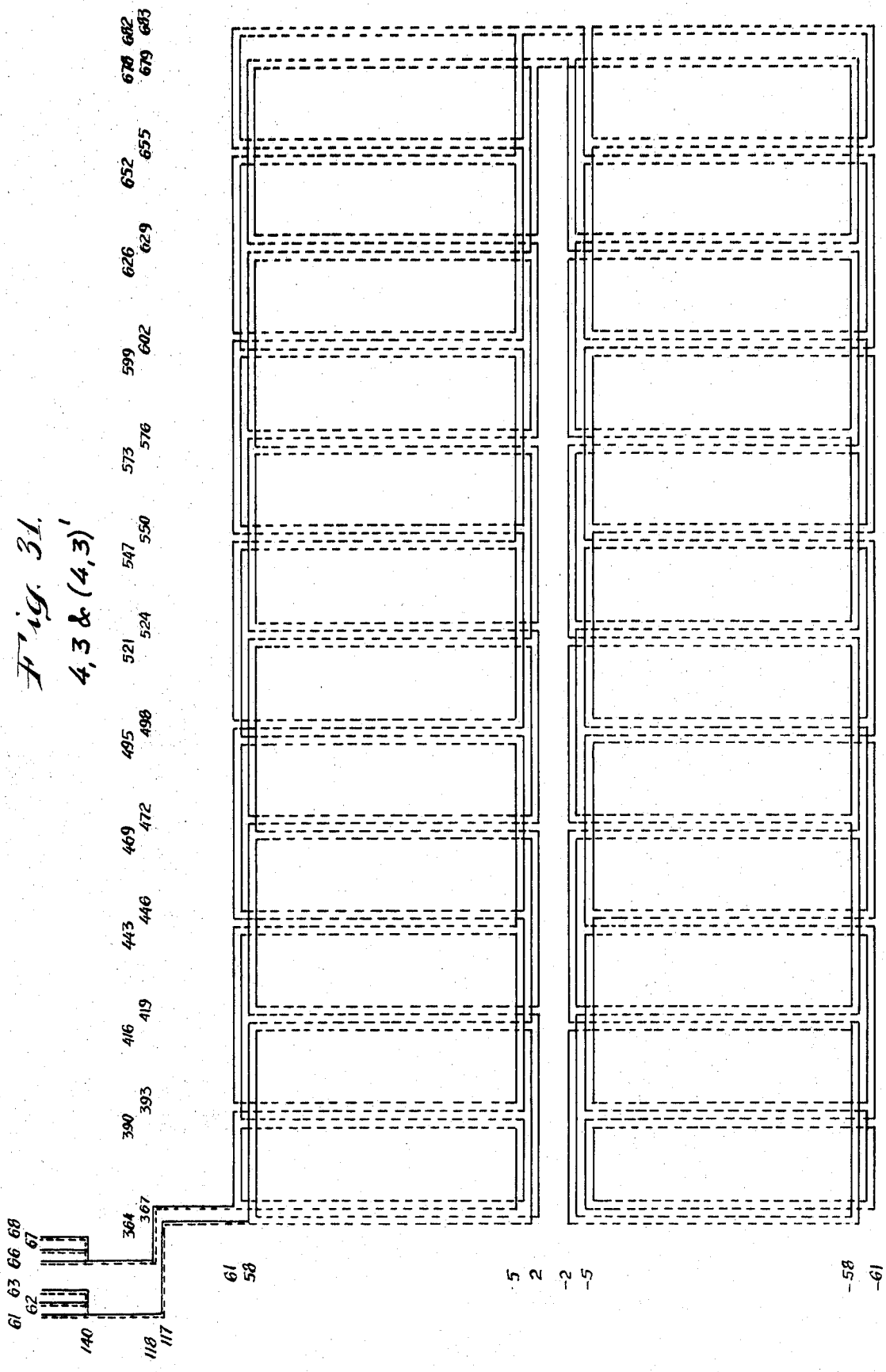

FIGS. 14a and 15a illustrate the current lines defined by the respective harmonics 4,1:

$$\Phi = xz[4z^2 - 3(x^2 + y^2)]$$

and 4,1:

$$\Phi + yz[4z^2 - 3(x^2 + y^2)].$$ The cylinder projections are shown on respective FIGS. 14b and 15b, the side views are shown in FIGS. 14c and 15c, and the scroll embodiments of both is shown in FIG. 29.

Figure 16A:
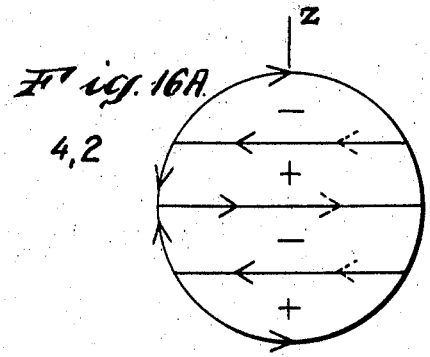
Figure 16B:
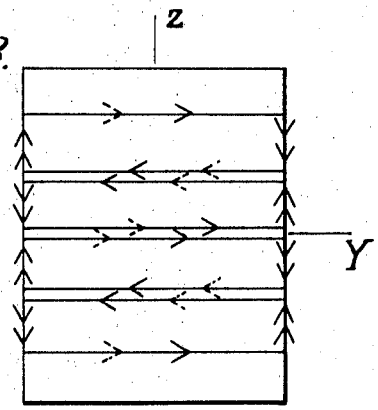
Figure 16C:
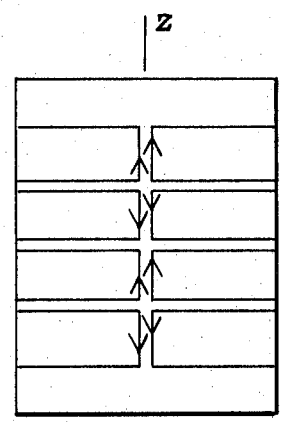
Figure 17A:
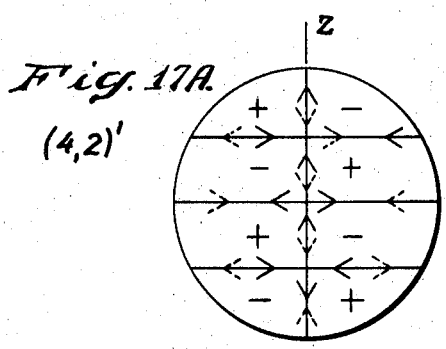
Figure 17B:
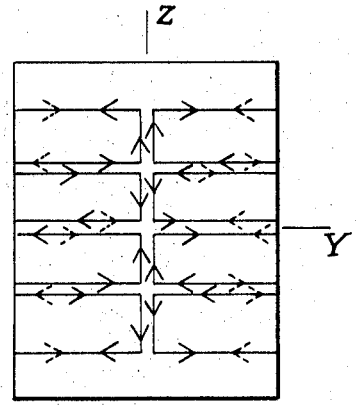
Figure 17C:
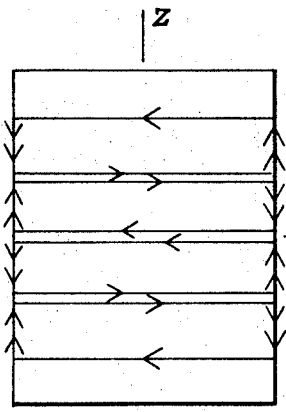

The current lines defined by the twins 4,2:

$$\Phi = xy(6z^2 - x^2 - y^2)$$

and 4,2′:

$$\Phi = (x^2 - y^2)(6z^2 - x^2 - y^2)$$

are illustrated by the respective FIGS. 16a and 17a. FIGS. 16b and 17b illustrate the cylinder projections, FIGS. 16c and 17c the side views, and FIG. 30 the scroll embodiments.

Figure 18A:
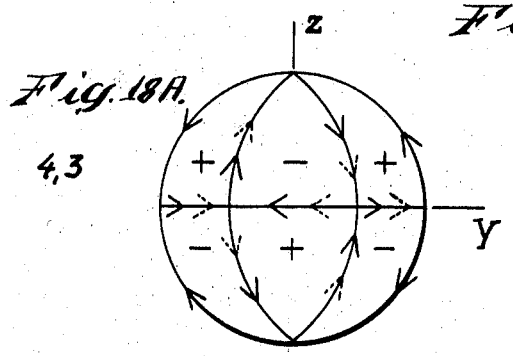
Figure 18B:
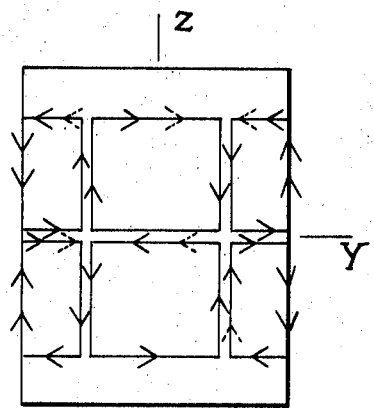
Figure 18C:
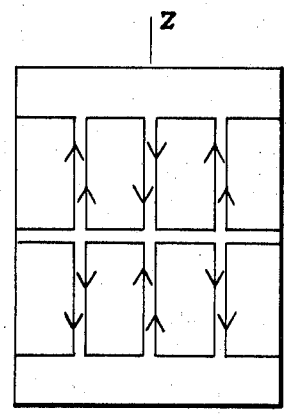
Figure 19A:
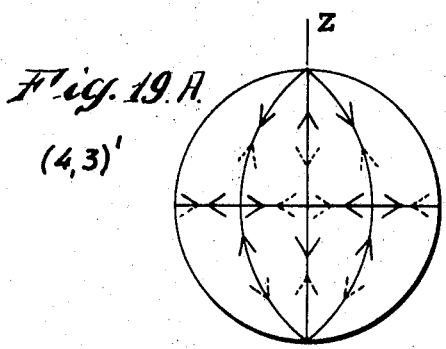
Figure 19B:
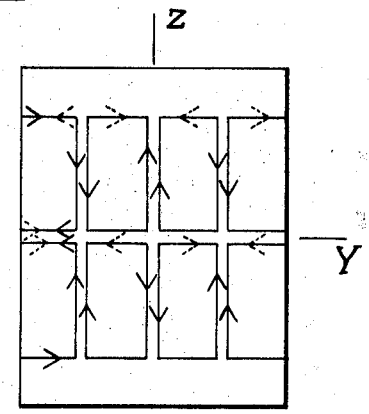
Figure 19C:
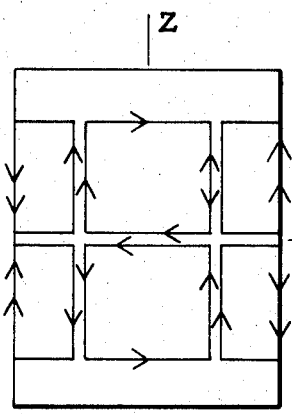

The current lines defined by the twins 4,3:

$$\Phi = xz(x^2 - 3y^2)$$

and 4,3′:

$$\Phi = yz(3x^2 - y^2)$$

are shown on respective FIGS. 18a and 19a. The cylinder projections are shown on FIGS. 18b and 19b, the side views in FIGS. 18c and 19c, and the scroll embodiments on FIG. 31.

While the windings described above produce principally the spherical harmonic $n,m$ for which they are specifically designed, they produce also ancillary harmonics of degree differing from the primary $n$ by an even number and/or of an order which is an odd multiple of the primary $m$. The several winding combinations have been selected to provide a reduction of several of these ancillary harmonics to a negligible value, as will be shown in the following discussion.

A "building block" of the zonal harmonics is the circular conductor of radius unity at a height $z$, and the potential and the successive derivatives of the potential produced by this conductor, which are expressions for the successive zonal harmonics into which this field may be decomposed, are, neglecting numerical factors or signs of trivial portent, and using the apostrophe to designate derivation with respect to $z$:

| | Pertinent zonal harmonic |
|---|---|
| $\phi = \dfrac{z}{(1+z^2)^{1/2}}$ | |
| $\phi' = H_z = \dfrac{1}{(1+z^2)^{3/2}}$ | 1, 0 |
| $\phi'' = H_z' = \dfrac{z}{(1+z^2)^{5/2}}$ | 2, 0 |
| $\phi''' = H_z'' = \dfrac{1-4z^2}{(1+z^2)^{7/2}}$ | 3, 0 |
| $\phi'''' = H_z''' = \dfrac{z(4z^2-3)}{(1+z^2)^{9/2}}$ | 4, 0 |
| $\phi''''' = H_z'''' = \dfrac{8z^4 - 12z^2 + 1}{(1+z^2)^{11/2}}$ | 5, 0 |

The values of four of these harmonics for different values of $z$ are tabulated below:

| $z=$ | $\dfrac{1}{\sqrt[4]{2}}$ | $\dfrac{1}{4}$ | $\dfrac{1}{\sqrt[3]{2}}$ | $\dfrac{1}{2}$ | $\dfrac{1}{\sqrt{2}}$ | 1 | $\sqrt{2}$ | 2 | $2\sqrt{2}$ |
|---|---|---|---|---|---|---|---|---|---|
| $\phi'=$ | | .91 | .84 | .72 | .54 | .35 | .19 | .09 | .04 |
| $\phi''=$ | | | .26 | .29 | .26 | .18 | .09 | | |
| $\phi'''=$ | .79 | .61 | .33 | 0 | −.24 | −.26 | −.15 | −.05 | |
| $\phi''''=$ | .53 | .20 | −.20 | −.44 | −.32 | −.07 | .02 | .01 | |

Recalling that $+z$ for the conductor center is the ordinal number shown on the scroll multiplied by .02 with .01 subtracted, and $-z$ is the negative ordinal number shown on the scroll multiplied by .02 with .01 added, the following statements can be made about the minimizing of harmonics contamination.

The 1,0 coil is a symmetric assembly of one clockwise loop at the heights ± .01 five clockwise loops at the average heights ± .83 and six counterclockwise loops at the average heights 1.80.

We have for the radii specified, the following 3,0 contamination:

$$\Phi''' (.01) = 1.0$$
$$5\Phi'''(.83) = -1.47$$
$$-6\Phi'''(1.80) = .48$$
$$\overline{\text{Total} \qquad = .01}$$

which indicates for this coil assembly substantial absence of 3,0 contamination.

We have further for the radii specified, the following 5,0 contamination:

$$\Phi''''' (.01) = 1.00$$
$$5\Phi'''''(.83) = -.90$$
$$-6\Phi'''''(1.80) = -.07$$
$$\overline{\text{Total} \qquad = .03}$$

which indicates for this coil assembly substantial absence also of 5,0 contamination.

The 2,0 coil is an antisymmetric assembly of coils at the average heights .86 and −.86 which is sufficiently close to the root of $\Phi''''$, $$\sqrt{\dfrac{3}{2}} = .866$$

to insure substantial absence of 4,0 contamination.

The 3,0 coil is a symmetric assembly of two and five clockwise loops at the respective average heights ±.30 and ±2.05, and seven counterclockwise loops at the average heights ±1.11.
We have:
2Φ' (.30) = 1.76
−7Φ' (1.11) = −2.10
5Φ' (2.05) = .42
Total = .08 which indicates fair absence of 1,0 contamination.
We have further:
2Φ''''' (.30) = 0.0
−7Φ''''' (1.11) = .14
5Φ''''' (2.05) = .05
Total = .19 which indicates fair absence of 5,0 contamination.

4,0 coil consists of an antisymmetric assembly of two clockwise coils at the average height .34, four counterclockwise coils at the average height 1.22, two counterclockwise coils at the average height −.34 and four clockwise coils at the average height −1.22.
We have:
2Φ'' (.34) = .52
−4Φ'' (1.22) = −.50
Total = .02 which indicates that there is good cancellation of 2,0 contamination.

The 5,0 coil is a symmetric assembly consisting of two clockwise coils at the average heights ±.02, three at the average heights = .93, four at the average heights ±1.38, and five at the average heights ±1.55, as well as six counterclockwise coils at the average heights ±.52 and eight at the average heights ±2.18.
We have:
2Φ' (.02) = 2.00
−6Φ' (.52) = −4.19
3Φ' (.93) = 1.18
4Φ (1.38) = .81
5Φ (1.55) = .80
−8Φ (2.18) = −.58
Total = .02 which indicates nearly complete freedom of contamination of the 1.0 (main field) harmonic.
We have also:
2Φ''' (.02) = 2.00
−6Φ''' (.52) = −.21
3Φ''' (.93) = −.83
4Φ''' (1.38) = −.63
5Φ''' (1.55) = −.71
−8Φ''' (2.18) = .32
Total = .06 which indicates very good cancellation of the 3.0 harmonic.

The building block of the coils generating tesseral harmonics of the first order is illustrated by FIG. 32 and consists of two straight conductors of length $z$, symmetrically placed in the $yz$ plane at a distance unity from the $z$-axis and connected by a semicircle of radius unity.

The $H_x$ fields generated at the origin by this building block as well as by those obtained by reflection in the $z$ plane and by reflection or antireflection in the $xy$ plane add up, and the application of Biot-Savart's law, simplified as elaborated in copending application Ser. No. 733,522 filed May 31, 1968, gives for $H_x$ and its successive derivatives with respect to $z$ expressions of the form:

$$H_x = 4 \frac{z^3 + 2z}{(z^2+1)^{3/2}} \quad \text{1, 1 harmonic.}$$

$$H_x' = 4 \frac{-z^2+2}{(z^2+1)^{5/2}} \quad \text{2, 1 harmonic.}$$

$$H_x'' = 4 \frac{3z^3-12z}{(z^2+1)^{7/2}} \quad \text{3, 1 harmonic.}$$

$$H_x''' = 4 \frac{-12z^4+81z^2-12}{(z^2+1)^{9/2}} \quad \text{4, 1 and 4, 3 harmonics.}$$

It will be noted that the harmonics for which $n + m$ is an even number are expressed in terms of odd powers of $z$, and require therefore an antisymmetric assembly of coils above and below the $z = 0$ plane, while those for which $n + m$ is odd are expressed in terms of even powers of $z$ and require a symmetric assembly of coils.

It is useful to obtain expressions for $$\frac{\partial^3 H_x}{\partial x^2 \partial z} \text{ and } \frac{\partial^3 H_x}{\partial y^2 \partial z}$$

These are also obtained from an application of the Biot-Savart law, and are:

$$\frac{\partial^3 H_x}{\partial x^2 \partial z} = 4 \frac{9z^4 - 57z^2 + 4}{(z^2+1)^{9/2}}$$

$$\frac{\partial^3 H_x}{\partial y^2 \partial z} = 4 \frac{3z^4 - 24z^2 + 8}{(z^2+1)^{9/2}}$$

In order to determine expressions for the relative amount of 4,1 and 4,3 harmonics produced by the building block of FIG. 32, we write first that this building block generates a fourth degree harmonic potential of the general expression:

¼ $A(4,1)$ + ¼ $B(4,3)$ = ¼ $Axz[4z^2 - 3(x^2+y^2)]$ + ¼ $Bz(x^3 - 3xy^2)$ wherefrom we obtain by differentiation:

$$\frac{\partial^3 H_x}{\partial z^3} = 6A \text{ and } \frac{\partial^3 H_x}{\partial x^2 \partial z} = -\frac{9}{2}A + \frac{3}{2}B$$

and $$A = 2\frac{-4z^4+27z^2-4}{(z^2+1)^{9/2}} \quad B = \frac{2}{3}\frac{+15z^2-20}{(z^2+1)^{9/2}}$$

Values proportional to $\partial H_x/\partial z$, A and B have been tabulated below for a few values of $z$:

| $z =$ | $\frac{1}{8}$ | $\frac{1}{\sqrt{2}}$ | $\frac{1}{4}$ | $\frac{1}{\sqrt{2}}$ | $\frac{1}{2}$ | $\frac{1}{\sqrt{2}}$ | 1 | $\sqrt{2}$ | 2 |
|---|---|---|---|---|---|---|---|---|---|
| $\frac{1}{4}\frac{\partial H_x}{\partial z} =$ | 1.91 | 1.82 | 1.67 | 1.40 | 1.00 | .54 | .18 | 0 | −.04 |
| $-\frac{1}{4}A =$ | 1.67 | 1.38 | .89 | .20 | −.46 | −.69 | −.42 | −.12 | −.03 |
| $-\frac{1}{4}B =$ | 3.07 | 2.83 | 2.43 | 1.78 | .99 | .34 | .04 | −.02 | −.00 |

These tables have been utilized to select windings for the generation of the 2,1 and 4,1 harmonics, and their complements, 2,1' and 4,1' which minimize their mutual contamination as well as contamination of the 4,3 and 4,3' harmonics. For the 4,1 and harmonics, two pairs of matching building blocks have been placed at the average heights .38 and 1.10, and four pairs with the reverse polarity at the average heights .58 with a symmetric structure below the $z = 0$ plane.
We have:

$$\frac{1}{4}\left[\frac{\partial H_x}{\partial z}(.38) + \frac{\partial H_x}{\partial z}(1.10) - 2\frac{\partial H_x}{\partial z}(.58)\right]$$
$$= 1.33 + .10 - 2 \times .81 = -.19$$

which indicates that fair absence of 2,1 contamination has been achieved for the 4,1 and 4,1' windings.
We have also:

−¼ [$B(.38) + B(1.10) - 2B(.58)$] = 1.61 + .01 − 2×.68 = .26 which indicates also that fair absence of 4,3 contamination has been achieved for the 4,1 and 4,1' windings.

There is no contamination possible from the 4,3 winding for any harmonic of degree lower than 6, and the coil positions for this harmonic have been selected from available positions as follows: two sextuple coils at the average height .04 and two sextuple coils at the average height 1.16, and symmetric assemblies below the $z = 0$ plane. Likewise, the average heights, .08 and 1.20 have been selected for the 4,3' coils.

Absence of 4,1 and 4,1' contamination has been achieved for the 2,1 and 2,1' windings by selecting the heights .40 and 1.64 for two pairs of building blocks for each winding at these heights, and symmetric assemblies below the $z=0$ planes. We have indeed:

$$A(.40) - A(1.64) = -.07 + .07 = 0$$

which indicates excellent absence of contamination of the 4,1 and 4,1' harmonics by the 2,1 and 2,1' windings.

However, the 2,1 ($\partial Hx/\ z$) and $B$ functions are so similar that achieving freedom of contamination of the 4,3 harmonic by the 2,1 winding with the method outlined above would be relatively tedious. Instead, the circuit arrangement of FIG. 33 is utilized, whereby the current energizing the 2,1 coil 80 and derived from potentiometer 82 is partially bled through a resistance 84 to feed the 4,3 coil 86, while a relatively low impedance of the potentiometer 82 inhibits operation of potentiometer 88 from affecting the current in the 2,1 winding.

Assuming that the impedances of the 2,1 and 4,1 coils are also negligibly small when compared to the resistances of resistors 90, 84 and 92, the $R_{90}/R_{84}$ ratio can be determined by the condition that any 4,3 ancillary harmonic generated by the 4,3 coil carrying the current bled from potentiometer 82 by resistance 84.

The 2,1 coil has two loops at the average heights .40 and 1.64; the values of $-\frac{1}{4} B$ at these two heights are 1.50 and $-.01$, and their difference is 1.51, which is a measure of the 4,3 ancillary harmonic generated by the 2,1 coil. Likewise the 4,3 coil has two loops at the heights .04 and 1.16; the values of $-\frac{1}{4} B$ at these heights are 3,30 and $-.01$ and their difference is 3.31. However, since the 4,3 winding may be considered as the superposition of a 2,1 winding, plus a 2,1 winding rotated 120° about the $z$-axis, plus a 2,1 winding rotated 240° about the $z$-axis, the figure 3.31 must be multiplied by 3, yielding 9.93 as a measure of the 4,3 harmonic generated by the 4,3 coil. The ratio $R_{90}/R_{84}$ should then be equal to the $1.51/9.93 = .152$ ratio. Furthermore, care should be taken that the currents generated by $P_1$ in the 2,1 and 4,3 coils flow in opposite directions in those straight vertical portions of these coils which overlap when the circuit board 73 is rolled into a scroll.

A nearly equal ratio could be shown to obtain for the $R_{90}/R_{84}$ ratio of the network for the 2,1' and 4,3' coils. The value of resistance 92 is not critical in these considerations, and need only be chosen with engineering reasonableness.

The 3,1 coil is an antisymmetric assembly which comprises four building blocks at the average height .24 and of two of opposite polarity at the average height .98. The heights .22 and .96 have been similarly selected for the 3,1' winding. The only contamination of lower degree possible for these are the 1,1, 1,1' 3,3 and 3,3' harmonics, and since they correspond to fields which are normal to the main field, their effect is only negligibly disturbing. Both the 3,1 and 3,1' windings are continued into antisymmetric structures below the $z = 0$ plane.

No contamination of degree lower than 5 can be produced by the 3,2 and 3,2' windings. According to space available they have been assigned the following spaces: 3,2 windings: two pairs of coils each at the heights .06 and 1.44, and symmetric structures below the $z = 0$ plane. Likewise, the heights .10 and 1.48 have been assigned to the 3,2' windings.

The only contaminations possible for the 4,2 and 4,2' windings are 2,2 and respectively, and others of degree 6 and above. Those of degree 2 corresponding to fields which, because they are normal to the main field, are of negligibly small disturbing value, and in accordance with space available, the 4,2 winding has been allotted the average heights .38 and 1.00 for four pairs and two pairs of conductors respectively. The average heights .38 and 1.04 have been allotted similarly to the 4,2' winding, and both are completed with antisymmetric structures below the $z = 0$ plane.

An improved homogenizing coil arrangement has been described for use with a superconductive NMR apparatus. A relatively large number of orthogonally related corrective fields are thereby provided in an arrangement which is relatively compact, and which facilitates fabrication.

While I have illustrated and described a particular embodiment of my invention, it will be understood that various modifications may be made therein without departing from the spirit of the invention and the scope of the appended claims.

I claim:

1. A field-homogenizing coil arrangement for a nuclear magnetic resonance apparatus having a polarizing field component comprising:
   a coil form assembly having a body thickness thereof formed from an elongated sheet of insulating material sandwiched between first and second planar electroconductors, said body thickness rolled to provide a generally tubular shaped coil form having a longitudinal axis thereof and an overlapping thickness;
   said coil form positioned about a test sample and having said longitudinal axis aligned with the polarizing field component;
   a plurality of arcuate shaped electrically conductive segments formed by said first electroconductor surface, each of said arcuate segments laying in planes which are normal to the polarizing field component of the apparatus;
   a plurality of rectilinear shaped electrically conductive segments formed by said second electroconductor, said rectilinear segments extending in a direction generally perpendicular to said arcuate segments and parallel to the polarizing field component of the apparatus;
   means providing electrically conductive coupling through said insulating material between arcuate and rectilinear segments to provide a plurality of separate electrically insulated field generating coils; and
   said arcuate and rectilinear segments spaced on said form and intercoupled in a manner for providing that each of said field generating coils establish orthogonally related homogenizing fields when a current flows in the coils and at least some of the rectilinear segments of an individual coil are overlaid at said overlapping portion for carrying current in an opposite direction in a manner for effectively cancelling the magnetic fields established by them.

2. The homogenizing coil arrangement of claim 1, wherein each of said coils is formed for establishing a corrective magnetic field representable by a spherical harmonic of particular degree $n$ and order $m$.

3. The field homogenizing coil arrangement of claim 2 wherein said magnetic potential from which said fields are derived comprises zonal and tesseral harmonics of successively higher degree.

4. The field homogenizing coil arrangements of claim 3 wherein said insulative form comprises a central insulative material of a double-clad printed circuit board and said segments are formed from conductive metal surfaces adhering to said insulative material, said double-clad board having a thickness adapting said board to be rolled into a scroll shaped configuration.